US012453464B2

(12) United States Patent
Kinouchi

(10) Patent No.: US 12,453,464 B2
(45) Date of Patent: Oct. 28, 2025

(54) ENDOSCOPE PROCESSOR AND ENDOSCOPE SYSTEM INCLUDING A CONNECTOR FOR RECEIVING A FIRST OR SECOND TYPE CONNECTOR

(71) Applicant: OLYMPUS CORPORATION, Hachioji (JP)

(72) Inventor: Hideaki Kinouchi, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 463 days.

(21) Appl. No.: 17/941,443

(22) Filed: Sep. 9, 2022

(65) Prior Publication Data

US 2023/0000320 A1 Jan. 5, 2023

Related U.S. Application Data

(63) Continuation of application No. PCT/JP2020/010884, filed on Mar. 12, 2020.

(51) Int. Cl.
*A61B 1/04* (2006.01)
*A61B 1/00* (2006.01)

(52) U.S. Cl.
CPC .......... *A61B 1/04* (2013.01); *A61B 1/00124* (2013.01); *A61B 1/00126* (2013.01); *A61B 1/00128* (2013.01)

(58) Field of Classification Search
CPC .......... A61B 1/00124–00128; A61B 1/00032; A61B 1/00013
See application file for complete search history.

(56) References Cited

U.S. PATENT DOCUMENTS 6,193,163 B1* 2/2001 Fehrman .......... G06K 19/07743
235/441
6,955,300 B1* 10/2005 Yoshigi .............. G06K 19/0723
235/441

(Continued)

FOREIGN PATENT DOCUMENTS

JP H07-184853 A 7/1995
JP H10155740 * 6/1998

(Continued)

OTHER PUBLICATIONS

International Search Report dated Jun. 16, 2020 issued in counterpart International Application No. PCT/JP2020/010884, with English Translation. (5 pages).

*Primary Examiner* — Anh Tuan T Nguyen
*Assistant Examiner* — Li-Ting Song
(74) *Attorney, Agent, or Firm* — WHDA, LLP

(57) ABSTRACT

An endoscope processor includes a receptacle that allows insertion of either a first connector for endoscope or a second connector for endoscope, and the receptacle includes: a primary coil performing power feeding to a secondary coil of the first connector for endoscope without using an electric contact; an optical fiber in an optical fiber insertion hole performing signal reception and transmission with an optical fiber in an optical fiber plug without using an electric contact; and electric contacts performing power feeding to and signal reception and transmission with respective electric contacts by contact, the primary coil, the optical fiber insertion hole, and the electric contacts being provided in positions respectively facing the secondary coil, the optical fiber, and the electric contacts.

18 Claims, 27 Drawing Sheets

(56) References Cited

U.S. PATENT DOCUMENTS

| | | | | |
|---|---|---|---|---|
| 7,959,471 B2* | 6/2011 | Omori | A61B 1/00128 | |
| | | | 439/630 | |
| 10,842,356 B2* | 11/2020 | Hagihara | A61B 1/00117 | |
| 2006/0116550 A1* | 6/2006 | Noguchi | A61B 1/00121 | |
| | | | 600/131 | |
| 2007/0060789 A1* | 3/2007 | Uchimura | A61B 1/00105 | |
| | | | 600/110 | |
| 2008/0269560 A1* | 10/2008 | Ito | A61B 1/00119 | |
| | | | 600/132 | |
| 2008/0281157 A1* | 11/2008 | Miyagi | A61B 1/00128 | |
| | | | 385/75 | |
| 2013/0035550 A1* | 2/2013 | Watanabe | G02B 23/2484 | |
| | | | 600/132 | |
| 2014/0309491 A1* | 10/2014 | Karasawa | A61B 1/00016 | |
| | | | 600/103 | |
| 2015/0272426 A1* | 10/2015 | Narita | A61B 1/00124 | |
| | | | 600/132 | |
| 2016/0089000 A1* | 3/2016 | Hara | A61B 1/00112 | |
| | | | 600/112 | |
| 2017/0000415 A1* | 1/2017 | Lapetina | A61B 5/0205 | |
| 2017/0172400 A1* | 6/2017 | Shimomura | A61B 1/00126 | |
| 2017/0340190 A1* | 11/2017 | Niwa | H01R 13/7039 | |
| 2018/0000332 A1* | 1/2018 | Hara | A61B 1/00126 | |
| 2018/0285153 A1* | 10/2018 | Yu | G06F 9/542 | |
| 2018/0296067 A1* | 10/2018 | Amling | A61B 1/00128 | |
| 2019/0200844 A1* | 7/2019 | Shelton, IV | H04L 67/10 | |
| 2019/0201047 A1 | 7/2019 | Yates et al. | | |
| 2019/0350438 A1 | 11/2019 | Masuno et al. | | |
| 2020/0179670 A1* | 6/2020 | West | A61M 25/01 | |
| 2022/0104692 A1* | 4/2022 | Deyanov | A61B 1/00016 | |
| 2022/0369908 A1* | 11/2022 | Komatsu | H02J 50/10 | |
| 2023/0074215 A1* | 3/2023 | Cooter | A61B 1/00128 | |

FOREIGN PATENT DOCUMENTS

| | | | | |
|---|---|---|---|---|
| JP | 2002-216902 A | 8/2002 | | |
| JP | 2005-312687 A | 11/2005 | | |
| JP | 2008-043763 A | 2/2008 | | |
| JP | 2008-278970 A | 11/2008 | | |
| JP | 2014-204892 A | 10/2014 | | |
| JP | 2016-010496 A | 1/2016 | | |
| JP | 6106142 B2 | 3/2017 | | |
| JP | 2018-027317 A | 2/2018 | | |
| JP | 2021-166565 A | 10/2021 | | |
| WO | 2011/114957 A1 | 9/2011 | | |
| WO | WO-2011114772 A1 * | 9/2011 | | A61B 1/00124 |
| WO | 2016/203824 A1 | 12/2016 | | |
| WO | 2017/086483 A1 | 5/2017 | | |
| WO | 2018/142949 A1 | 8/2018 | | |
| WO | 2019/133056 A1 | 7/2019 | | |
| WO | WO-2019225167 A1 * | 11/2019 | | |

\* cited by examiner

ENDOSCOPE PROCESSOR AND ENDOSCOPE SYSTEM INCLUDING A CONNECTOR FOR RECEIVING A FIRST OR SECOND TYPE CONNECTOR

CROSS REFERENCE TO RELATED APPLICATION

This application is a continuation application of PCT/JP2020/010884 filed on Mar. 12, 2020, the entire contents of which are incorporated herein by this reference.

BACKGROUND OF THE INVENTION

1. Field of the Invention

The present invention relates to an endoscope processor and an endoscope system capable of performing power feeding to and signal transmission and reception with a connector for endoscope in a non-contact manner.

2. Description of the Related Art

Conventionally, in the medical field, an endoscope has widely been used that allows observation of an organ within a body cavity or the like by inserting an elongated insertion portion into the body cavity. For displaying an observation image of the organ within the body cavity or the like on a monitor, an endoscope (electronic endoscope) has widely been used in which a solid image pickup device, such as a Charge Coupled Device (CCD), is disposed in an image pickup portion at the distal end or the rear end of the insertion portion of the endoscope.

A signal outputted from the image pickup device provided in the endoscope is turned into a video signal by an endoscope processor separate from the endoscope and outputted to the monitor. The connection between the endoscope and the endoscope processor is established with the insertion of a connector for endoscope provided in the endoscope into a receptacle that is a connector receiver provided in the endoscope processor. In other words, the connector for endoscope is provided with a plurality of electric contacts, such as an electric contact for power, an electric contact for image signal transmission, and an electric contact for control signal reception. Meanwhile, the receptacle of the endoscope processor is provided with a plurality of electric contacts corresponding to the respective electric contacts of the connector for endoscope. When the connector for endoscope is inserted into the receptacle, the electric contacts of the connector for endoscope are electrically connected to the electric contacts of the receptacle, so that the connection between the endoscope and the endoscope processor is established.

In recent years, a configuration of an endoscope system including an endoscope and an endoscope processor has been proposed in which the transfer of power and various signals between the connector for endoscope and the receptacle is realized in a non-contact manner (wirelessly) without using an electric contact. For example, Japanese Patent No. 6106142 discloses an endoscope system in which a connector for endoscope (first connector) is provided with a power receiving unit formed by a secondary coil, an image signal transmission unit including a light emitting element, and a signal transmission and reception unit including a light emitting element and a light receiving element, and a receptacle (second connector) is provided with a power supply unit formed by a primary coil, an image signal reception unit including a light receiving element, and a signal transmission and reception unit including a light receiving element and a light emitting element.

SUMMARY OF THE INVENTION

An endoscope processor according to one aspect of the present invention allows insertion of either a first endoscope or a second endoscope, the first endoscope including a non-contact type power receiving member and a non-contact type signal transmitting and receiving member in a first connector for endoscope, the second endoscope including at least one or more scope-side electric contacts adapted to perform power reception and signal transmission and reception in a second connector for endoscope, and includes a connector receiver that allows insertion of either the first connector for endoscope or the second connector for endoscope, the connector receiver including: a non-contact type power feeding member configured to perform power feeding to the power receiving member without using an electric contact: a non-contact type signal receiving and transmitting member configured to perform reception and transmission with the signal transmitting and receiving member without using an electric contact; and at least one or more processor-side electric contacts configured to perform power feeding to and signal reception and transmission with the scope-side electric contact by contact, in which the power feeding member is provided in a position adjacently facing the power receiving member when the first connector for endoscope is inserted into the connector receiver, an end face of the signal receiving and transmitting member is provided in a position facing an end face of the signal transmitting and receiving member when the first connector for endoscope is inserted into the connector receiver, and the processor-side electric contact is provided in a position facing the scope-side electric contact when the second connector for endoscope is inserted into the connector receiver.

An endoscope processor according to another aspect of the present invention allows insertion of either a first endoscope or a second endoscope, the first endoscope including a non-contact type power receiving member in a first connector for endoscope, the second endoscope including at least one or more scope-side electric contacts adapted to perform power reception in a second connector for endoscope, and includes a connector receiver that allows insertion of either the first connector for endoscope or the second connector for endoscope, the connector receiver including: a non-contact type power feeding member configured to perform power feeding to the power receiving member without using an electric contact; and at least one or more processor-side electric contacts configured to perform power feeding to the scope-side electric contact by contact, in which the power feeding member is provided in a position adjacently facing the power receiving member when the first connector for endoscope is inserted into the connector receiver, and the processor-side electric contact is provided in a position facing the scope-side electric contact when the second connector for endoscope is inserted into the connector receiver.

An endoscope processor according to yet another aspect of the present invention allows insertion of either a first endoscope or a second endoscope, the first endoscope including a non-contact type signal transmitting and receiving member in a first connector for endoscope, the second endoscope including at least one or more scope-side electric contacts adapted to perform signal transmission and reception in a second connector for endoscope, and includes a connector receiver that allows insertion of either the first connector for endoscope or the second connector for endoscope, the connector receiver including: a non-contact type signal receiving and transmitting member configured to perform reception and transmission with the signal transmitting and receiving member without using an electric contact; and at least one or more processor-side electric contacts configured to perform signal reception and transmission with the scope-side electric contact by contact, in which an end face of the signal receiving and transmitting member is provided in a position facing an end face of the signal transmitting and receiving member when the first connector for endoscope is inserted into the connector receiver, and the processor-side electric contact is provided in a position facing the scope-side electric contact when the second connector for endoscope is inserted into the connector receiver.

An endoscope system according to one aspect of the present invention includes the endoscope processor and the first endoscope, in which the power feeding member is provided in a position adjacently facing the power receiving member when the first connector for endoscope is inserted into the connector receiver, and an end face of the signal receiving and transmitting member is provided in a position facing an end face of the signal transmitting and receiving member when the first connector for endoscope is inserted into the connector receiver.

An endoscope system according to another aspect of the present invention includes the endoscope processor and the second endoscope, in which the processor-side electric contact is provided in a position facing the scope-side electric contact when the second connector for endoscope is inserted into the connector receiver.

DETAILED DESCRIPTION OF THE PREFERRED EMBODIMENTS

Figure 1:
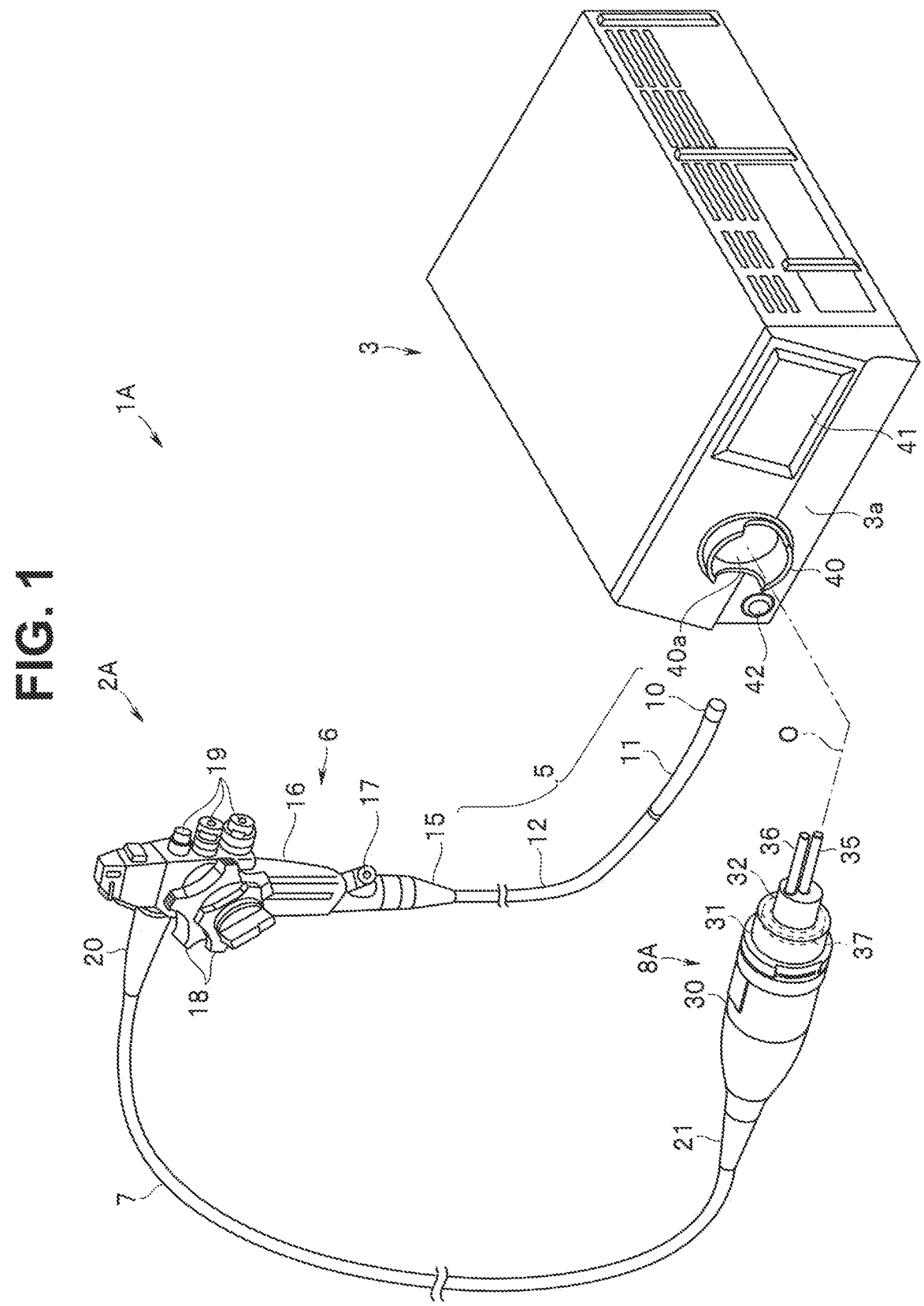
FIG. 1 is a perspective view related to a first embodiment and showing an endoscope system including an endoscope having a non-contact type connector for endoscope.

Hereinafter, embodiments of the present invention will be described with reference to the drawings. Note that the scale sizes of the components are differentiated in the drawings used for descriptions below so that the components are recognizable enough in the drawings. The present invention is not limited only to the numbers of components, the shapes of components, the ratios in size of components, and the relative positional relations among the components described in the drawings.

First Embodiment

Figure 2:
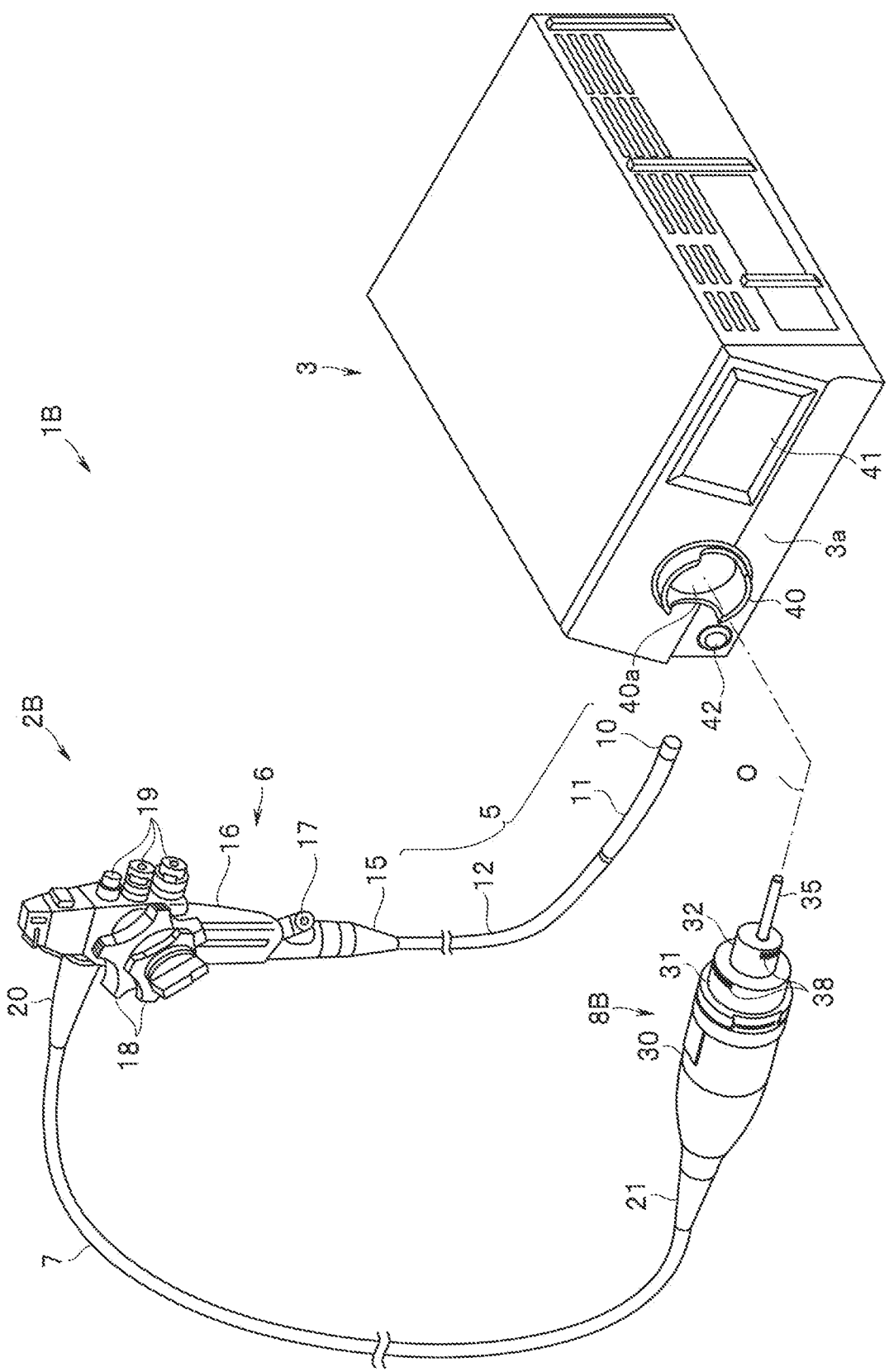
FIG. 2 is a perspective view related to the first embodiment and showing an endoscope system including an endoscope having an electric contact type connector for endoscope.

FIG. 1 to FIG. 7 relate to a first embodiment of the present invention. As shown in FIGS. 1 and 2, an endoscope processor 3 of the present embodiment is capable of forming a first endoscope system 1A or a second endoscope system 1B together with a first endoscope 2A or a second endoscope 2B.

As shown in FIG. 1, the first endoscope 2A includes an insertion portion 5 insertable into a subject, such as a human body, an operation portion 6 provided continuously with the proximal end side of the insertion portion 5, a universal cable 7 that is a composite cable extending from a side surface of the operation portion 6, and a first connector for endoscope 8A provided in an end portion of the universal cable 7.

The main part of the insertion portion 5 is formed such that a rigid distal end portion 10, a bending portion 11 provided continuously with the proximal end side of the distal end portion 10, and a flexible tube portion 12 provided continuously with the proximal end side of the bending portion 11 are provided continuously in this order from the distal end side.

In the present embodiment, the distal end portion 10 includes, on the distal end face, an observation window, an illumination window, and a treatment instrument channel port (none of which is shown).

An image pickup unit (not shown) is provided on a back surface side of the observation window inside the distal end portion 10. The image pickup unit includes, for example, an image pickup device including a CCD, a CMOS, or the like, a laser diode that is a light emitting element that converts an electric signal into an optical signal, and a photo diode that is a light receiving element that converts an optical signal into an electric signal. The image signal obtained by performing image pickup by the image pickup device is converted into an optical signal by the laser diode, and is then made incident onto one end of an optical fiber 36a (see FIG. 3) connected to the image pickup unit. One end of a light guide bundle 35a (see FIG. 3) is disposed on the back surface side of the illumination window inside the distal end portion 10. An end of a treatment instrument channel (not shown) is connected to the treatment instrument channel port inside the distal end portion 10. The other end sides of the optical fiber 36a, the light guide bundle 35a, and the treatment instrument channel extend through the inside of the bending portion 11 and the flexible tube portion 12 into the operation portion 6. Note that the laser diode for converting an image signal into an optical signal need not necessarily be disposed in the distal end portion 10. For example, the laser diode may also be disposed in the operation portion 6 or the connector 8A, which will be described later. In this case, the communication between the image pickup device and the laser diode can be established using well-known metal wiring. In other words, in such a case, the metal wiring is inserted through the bending portion 11 and the flexible tube portion 12, instead of the optical fiber 36a.

The operation portion 6 includes, on the distal end side, a bend preventing member 15 covering the outer periphery portion of the proximal end side of the flexible tube portion 12. The operation portion 6 includes, in an intermediate portion of the operation portion 6, a grasping portion 16 grasped by a user or the like in use. A treatment instrument insertion port 17 that forms an opening on the proximal end side of the treatment instrument channel is provided between the bend preventing member 15 and the grasping portion 16. The operation portion 6 is provided, on the proximal end side relative to the grasping portion 16, with a bending operation knob 18 that causes the bending portion 11 to perform bending operation in the up-down and left-right directions and switches 19 to which various functions of the first endoscope 2A are allocated.

The universal cable 7 includes a bend preventing member 20 or 21 in each of the opposite end portions that are each connected to the operation portion 6 or the first connector for endoscope 8A, the bend preventing member 20 or 21 adapted to prevent damage due to a twist and maintain the connection strength to cover the outer periphery portions of the opposite end portions. In the universal cable 7, the aforementioned optical fiber 36a and the light guide bundle 35a are inserted, and further, power wiring and the like (not shown) for performing power feeding to the image pickup unit or the like are inserted.

Figure 3:
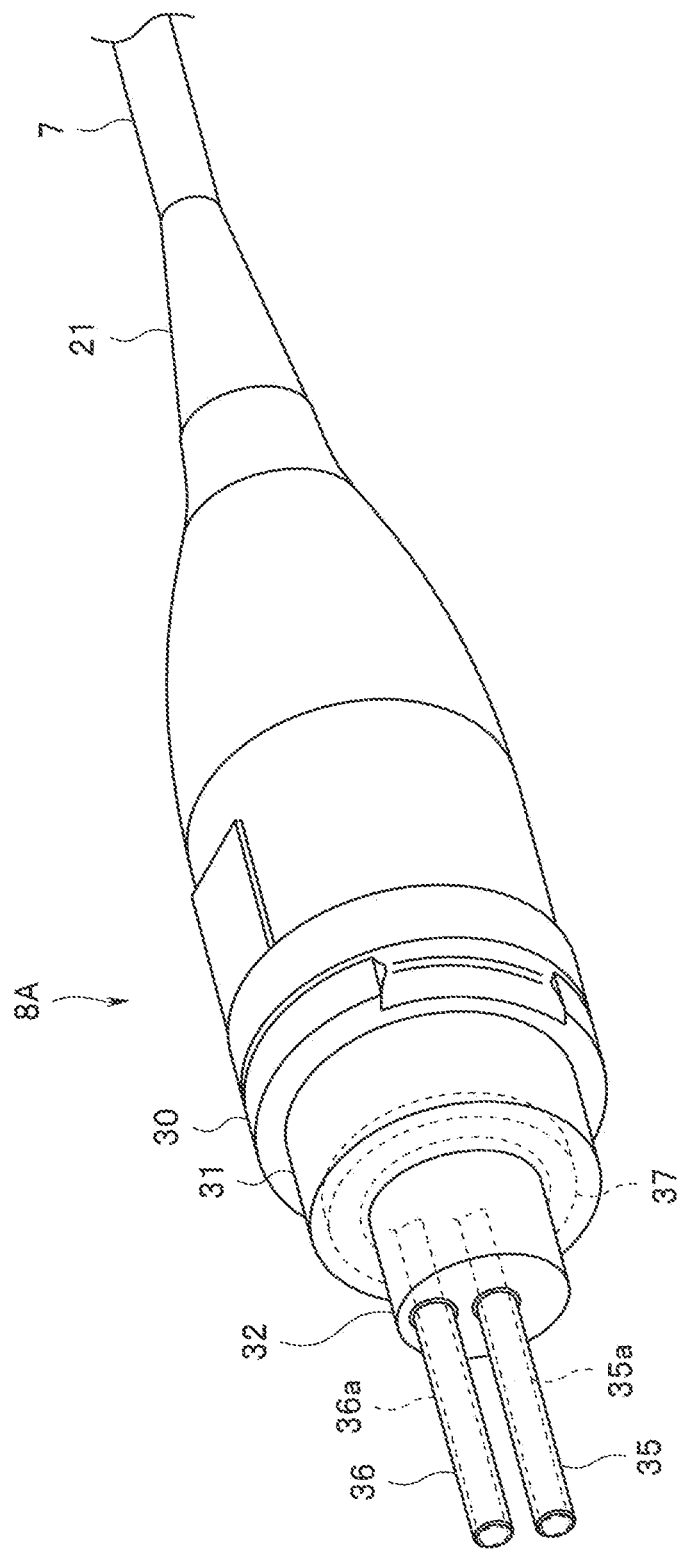
FIG. 3 is a perspective view related to the first embodiment and showing the non-contact type connector for endoscope.

As shown in FIGS. 1 and 3, the first connector for endoscope 8A includes a substantially cylindrical connector main body 30, a first cylindrical portion 31 projecting from the distal end face of the connector main body 30, and a second cylindrical portion 32 projecting from the distal end face of the first cylindrical portion 31. In other words, the basic shape of the first connector for endoscope 8A of the present embodiment is a substantially cylindrical shape with multiple steps with the outer diameter gradually reduced from the proximal end side (universal cable 7 side) toward the distal end side in a center axis O direction. Note that the basic shape of the first connector for endoscope 8A is not limited to a substantially cylindrical shape, but may be a tubular shape, such as a substantially polygonal tubular shape. The first connector for endoscope 8A of the present embodiment is inserted into a receptacle 40, which will be described later, in the center axis O direction. Therefore, in the following descriptions, the center axis O is referred to as an insertion axis O, as appropriate.

A light guide plug 35 retaining inside the other end portion of the light guide bundle 35a, and an optical fiber plug 36 retaining inside the other end portion of the optical fiber 36a project from the distal end face of the second cylindrical portion 32 of the first connector for endoscope 8A, in the center axis O direction of the first connector for endoscope 8A. In other words, the first connector for endoscope 8A includes, as a non-contact type (non-electric contact type) signal transmitting and receiving member, the optical fiber plug 36 retaining the optical fiber 36a, on the distal end face of the second cylindrical portion 32.

A secondary coil 37 is provided in a position along and adjacent to the distal end face of the first cylindrical portion 31 inside the first cylindrical portion 31 of the first connector for endoscope 8A. The secondary coil 37 is an annular coil including an inner diameter larger than the outer diameter of the second cylindrical portion 32 and including an inner diameter smaller than the outer diameter of the first cylindrical portion 31. Examples of the structure of the secondary coil 37 may include a structure including an annular substrate including a planar surface and a coil portion wound spirally or helically on the planar surface of the substrate. In other words, the first connector for endoscope 8A includes, as a non-contact type (non-electric contact type) power receiving member, the secondary coil 37 inside the first cylindrical portion 31.

Next, the configuration of the second endoscope 2B will be described. Note that the second endoscope 2B mainly differs from the aforementioned first endoscope 2A in the configuration of the second connector for endoscope 8B connected to an end portion of the universal cable 7. Therefore, the same components as the components of the aforementioned first endoscope 2A are appropriately assigned the same reference numerals and the descriptions will be omitted.

Figure 4:
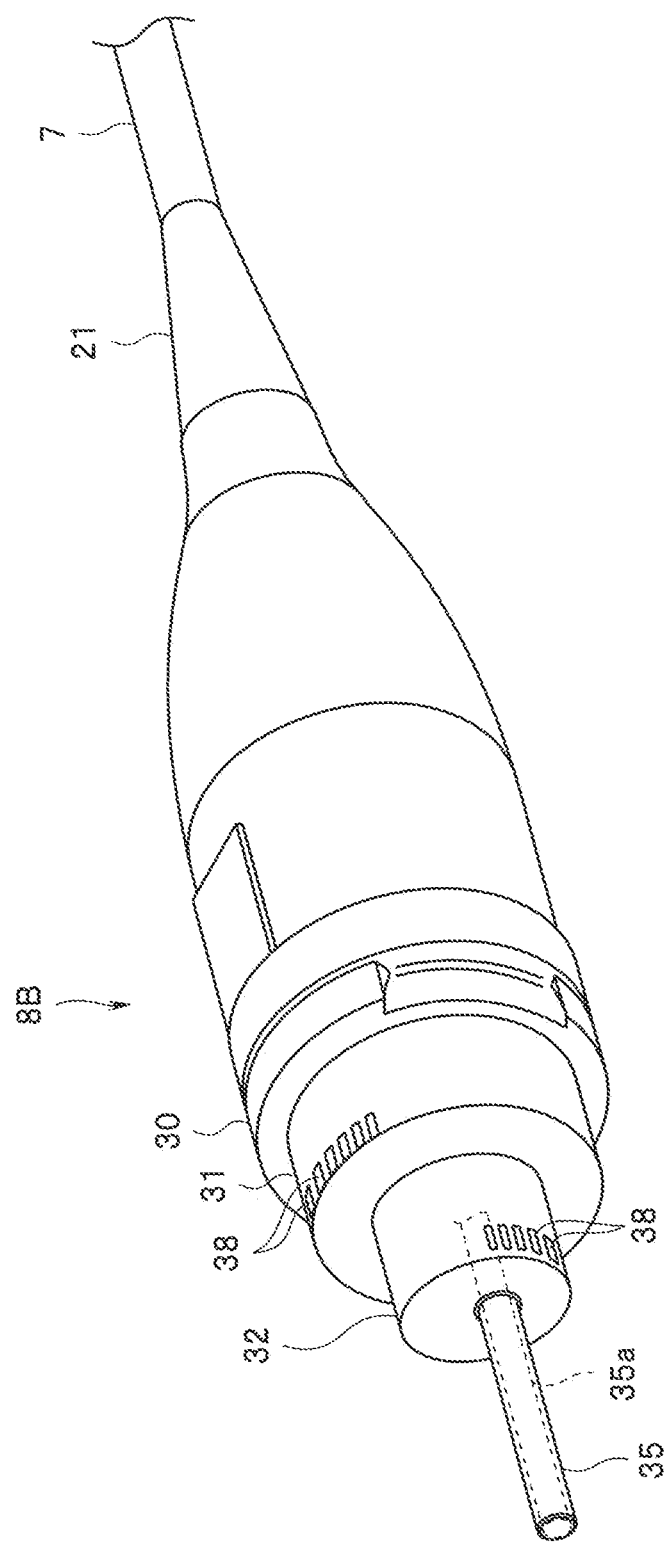
FIG. 4 is a perspective view related to the first embodiment and showing the electric contact type connector for endoscope.

As shown in FIGS. 2 and 4, the second connector for endoscope 8B includes the substantially cylindrical connector main body 30, the first cylindrical portion 31 provided in a projecting manner on the distal end face of the connector main body 30, and the second cylindrical portion 32 provided in a projecting manner on the distal end face of the first cylindrical portion 31. In other words, the basic shape of the second connector for endoscope 8B of the present embodiment is the same as the basic shape of the first connector for endoscope 8A and is in a substantially cylindrical shape with multiple steps with the outer diameter gradually reduced from the proximal end side (universal cable 7 side) toward the distal end side in the center axis O direction. Note that the basic shape of the second connector for endoscope 8B is not limited to a substantially cylindrical shape, similarly to the first connector for endoscope 8A, but may be a tubular shape, such as a substantially polygonal tubular shape. The second connector for endoscope 8B of the present embodiment is inserted into the receptacle 40, which will be described later, in the center axis O direction. Therefore, in the following descriptions, the center axis O is referred to as the insertion axis O, as appropriate.

The light guide plug 35 retaining inside the other end portion of the light guide bundle 35a projects from the distal end face of the second cylindrical portion 32 of the second connector for endoscope 88 in the center axis O direction of the second connector for endoscope 8B.

At least one or more (in the present embodiment, a plurality of) electric contacts 38 are provided on the outer peripheral surfaces (outer side surfaces) of the first cylindrical portion 31 and the second cylindrical portion 32. Of the electric contacts 38, some electric contacts 38 are electric contacts for power and are connected to power wiring (not shown) inside the second connector for endoscope 8B. The other electric contacts 38 are electric contacts for an image signal and a control signal and are connected to signal wiring including metal wiring (not shown) inside the second connector for endoscope 8B. In other words, the second connector for endoscope 8B includes, as a scope-side electric contact, at least one or more electric contacts 38 on the outer side surfaces of the first cylindrical portion 31 and the second cylindrical portion 32. Note that the electric contacts 38 may be arranged on at least one of the outer side surface of the first cylindrical portion 31 or the outer side surface of the second cylindrical portion 32.

The positions where the plurality of electric contacts 38 are provided in the second connector for endoscope 8B are set to be different from the positions where the optical fiber plug 36 and the secondary coil 37 are provided in the aforementioned first connector for endoscope 8A. Meanwhile, the position where the light guide plug 35 is provided in the second connector for endoscope 8B is set to correspond to the position where the light guide plug 35 is provided in the first connector for endoscope 8A.

It is preferable that the plurality of electric contacts 38 provided in the first cylindrical portion 31 and the plurality of electric contacts 38 provided in the second cylindrical portion 32 should be disposed in positions that are offset with respect to each other around the center axis O of the second connector for endoscope 8B. Such arrangement improves the operability in connecting the power wiring or the signal wiring to the electric contacts 38 provided in the first cylindrical portion 31 and the second cylindrical portion 32.

Note that the metal wiring connected to the electric contacts 38 is connected to the image pickup unit or the like in place of the optical fiber 36a and the metal wiring extends through the universal cable 7 into the second connector for endoscope 8B.

As shown in FIGS. 1 and 2, the endoscope processor 3 includes, on a front face 3a, the receptacle 40 as a connector receiver to which either the first connector for endoscope 8A or the second connector for endoscope 8B is connectable, a touch panel 41 for displaying an operation and a state, and a power switch 42. Note that an illumination light source, such as a halogen lamp (not shown), is installed inside the processor 3.

Figure 5:
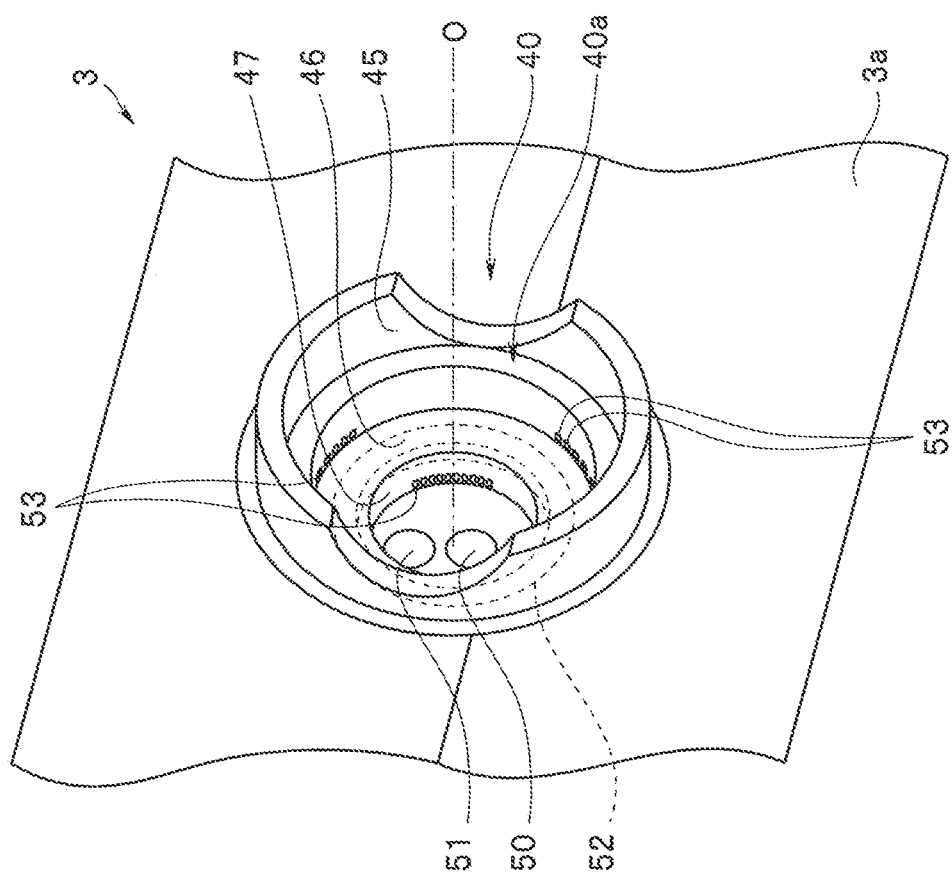
FIG. 5 is a perspective view related to the first embodiment and showing a receptacle.

As shown in FIG. 5, the receptacle 40 includes a connector reception hole 40a that allows insertion of either the first connector for endoscope 8A or the second connector for endoscope 8B. The connector reception hole 40a includes a substantially cylindrical reception hole main body 45, a first cylindrical hole 46 provided in a recessed manner on the proximal end face (the proximal end face when the opening portion side of the connector reception hole 40a is defined as the distal end side) of the reception hole main body 45, and a second cylindrical hole 47 provided in a recessed manner on the proximal end face of the first cylindrical hole 46. In other words, the basic shape of the endoscope reception hole 40a of the present embodiment is a substantially cylindrical shape with multiple steps with the outer diameter gradually reduced from the distal end side toward the proximal end side in the center axis O direction (namely, the insertion axis O direction).

The inner diameters of the reception hole main body 45, the first cylindrical hole 46, and the second cylindrical hole 47 are respectively set slightly larger than the outer diameters of the connector main body 30, the first cylindrical portion 31, and the second cylindrical portion 32 of the first and second connectors for endoscope 8A and 8B. The depths of the first cylindrical hole 46 and the second cylindrical hole 47 are respectively set to substantially correspond to the projecting lengths of the first cylindrical portion 31 and the second cylindrical portion 32 of the first and second connectors for endoscope 8A and 8B. Thus, the inner side surfaces and the proximal end faces of the reception hole main body 45, the first cylindrical hole 46, and the second cylindrical hole 47 are configured to face the outer side surfaces and the distal end faces of the connector main body 30, the first cylindrical portion 31, and the second cylindrical portion 32, respectively, when the first connector for endoscope 8A or the second connector for endoscope 8B is inserted into the receptacle 40.

Note that the basic shape of the connector reception hole 40a is not limited to a substantially cylindrical hole, but may be a tubular shape corresponding to the shapes of the first connector for endoscope 8A and the second connector for endoscope 8B when the first connector for endoscope 8A and the second connector for endoscope 8B are in a tubular shape, such as a substantially polygonal tubular shape.

A light guide insertion hole 50 that allows insertion of the light guide plug 35 and an optical fiber insertion hole 51 that allows insertion of the optical fiber plug 36 are provided on the proximal end face of the second cylindrical hole 47. The light guide insertion hole 50 and the optical fiber insertion hole 51 are, for example, hole portions extending in the insertion axis O direction. The light guide insertion hole 50 is provided in a position corresponding to the light guide plug 35 projecting from the first connector for endoscope 8A and the second connector for endoscope 8B. The optical fiber insertion hole 51 is provided in a position corresponding to the optical fiber plug 36 projecting from the first connector for endoscope 8A.

Figure 6:
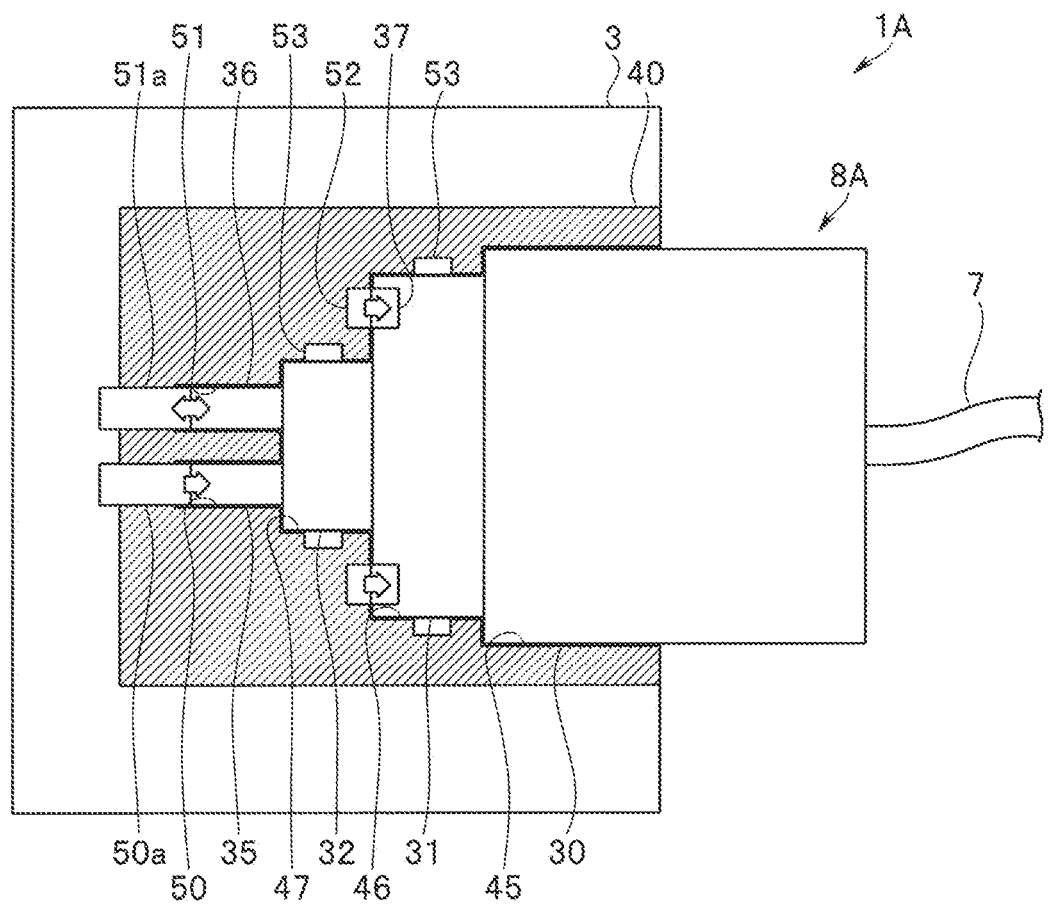
FIG. 6 is an explanatory view related to the first embodiment and showing power and signal transmission paths when the non-contact type connector for endoscope is connected to the receptacle.

As shown in FIGS. 5 and 6, a light guide bundle 50a is provided inside the light guide insertion hole 50 on the proximal end side. The light guide bundle 50a is optically connected to the light source, such as a halogen lamp, inside the endoscope processor 3. When the light guide plug 35 is inserted into the light guide insertion hole 50, the light guide bundle 35a inside the light guide plug 35 and the light guide bundle 50a inside the light guide insertion hole 50 are positioned so that the optical axes correspond to each other. Thus, the light guide bundle 50a is optically connected to the light guide bundle 35a so that the illumination light from the light source can be supplied to the light guide bundle 35a.

An optical fiber 51a is provided inside the optical fiber insertion hole 51 on the proximal end side. The optical fiber 51a is connected to the photo diode that is a light receiving element that converts an optical signal into an electric signal and the laser diode that is a light emitting element that converts an electric signal into an optical signal (neither shown) inside the endoscope processor 3. When the optical fiber plug 36 is inserted into the optical fiber insertion hole 51, the optical fiber 36a inside the optical fiber plug 36 and the optical fiber 51a inside the optical fiber insertion hole 51 are positioned so that the optical axes correspond to each other. Thus, the optical fiber 51a is optically connected to the optical fiber 36a and can perform reception and transmission of various signals with the optical fiber 36a in a non-contact manner (non-electric contact manner) without using the electric contact. In other words, the receptacle 40 includes, as a non-contact type (non-electric contact type) signal receiving and transmitting member, the optical fiber insertion hole 51 retaining the optical fiber 51a on the proximal end face of the second cylindrical hole 47.

A primary coil 52 is provided in a position along and adjacent to the proximal end face of the first cylindrical hole 46 inside the receptacle 40. The primary coil 52 is an annular coil including an inner diameter larger than the inner diameter of the first cylindrical hole 47 and including an outer diameter smaller than the inner diameter of the first cylindrical hole 46. Examples of the structure of the primary coil 52 may include a structure including an annular substrate including a planar surface and a coil portion wound spirally or helically on the planar surface of the substrate.

The primary coil 52 is provided in a position adjacently facing the secondary coil 37 when the first connector for endoscope 8A is inserted into the receptacle 40. Thus, the primary coil 52 is electromagnetically connected to the secondary coil 37 so that power can be fed to the secondary coil 37. In other words, the receptacle 40 includes, as a non-contact type (non-electric contact type) power feeding member, the primary coil 52 near the proximal end face of the first cylindrical hole 46.

At least one or more (in the present embodiment, a plurality of) electric contacts 53 are provided on the inner peripheral surfaces (inner side surfaces) of the first cylindrical hole 46 and the second cylindrical hole 47 inside the receptacle 40. The electric contacts 53 are provided in positions corresponding to the respective electric contacts 38 of the second connector for endoscope 8B. Of the electric contacts 53, some electric contacts 53 are electric contacts for power and are connected to power wiring (not shown) inside the endoscope processor 3. The other electric contacts 53 are electric contacts for an image signal and a control signal and are connected to signal wiring (not shown) inside the endoscope processor 3.

The electric contacts 53 are electrically connected to their respective electric contacts 38 by physical contact when the second connector for endoscope 8B is inserted into the receptacle 40. Thus, the electric contacts 53 can perform power feeding to and reception and transmission of various signals with the respective electric contacts 38. In other words, the receptacle 40 includes, as a processor-side electric contact for performing power feeding to and signal reception and transmission with the electric contacts 39 by contact, at least one or more electric contacts 53 on the inner peripheral surfaces of the first cylindrical hole 46 and the second cylindrical hole 47. Note that the electric contacts 53 may be arranged on at least one of the inner side surface of the first cylindrical hole 46 or the inner side surface of the second cylindrical hole 47. Note that the electric contacts 38 are arranged to face the respective electric contacts 53 when the connector for endoscope 8B is inserted into the receptacle 40.

Thus, the electric contacts 53 for electric connection with the second connector for endoscope 8B are provided in positions that are different from the positions of the optical fiber insertion hole 51 and the primary coil 52 inside the receptacle 40. In other words, the electric contacts 53 are arranged in dead spaces where the electric contacts 53 do not interfere with the optical fiber insertion hole 51 and the primary coil 52.

In such a configuration, as shown in FIG. 6, when the first connector for endoscope 8A of the first endoscope 2A is inserted into the receptacle 40 of the endoscope processor 3, the light guide plug 35 is inserted into the light guide insertion hole 50. Thus, the end face of the light guide bundle 35a retained in the light guide plug 35 faces the end face of the light guide bundle 50a retained in the light guide insertion hole 50 so that the light guide bundle 50a and the light guide bundle 35a are optically connected. In other words, the light source can be supplied from the light guide bundle 50a to the light guide bundle 35a.

With the insertion of the first connector for endoscope 8A into the receptacle 40, the optical fiber plug 36 is inserted into the optical fiber insertion hole 51. Thus, the end face of the optical fiber 36a retained in the optical fiber plug 36 faces the end face of the optical fiber 51a retained in the optical fiber insertion hole 51 so that the optical fiber 51a and the optical fiber 36a are optically connected. In other words, various signals can be transmitted and received between the optical fiber 51a and the optical fiber 36a without using the electric contact.

With the insertion of the first connector for endoscope 8A into the receptacle 40, the secondary coil 37 faces adjacently the primary coil 52 so that the primary coil 52 and the secondary coil 37 are electromagnetically connected. In other words, power can be fed from the primary coil 52 to the secondary coil 37 without using the electric contact.

Figure 7:
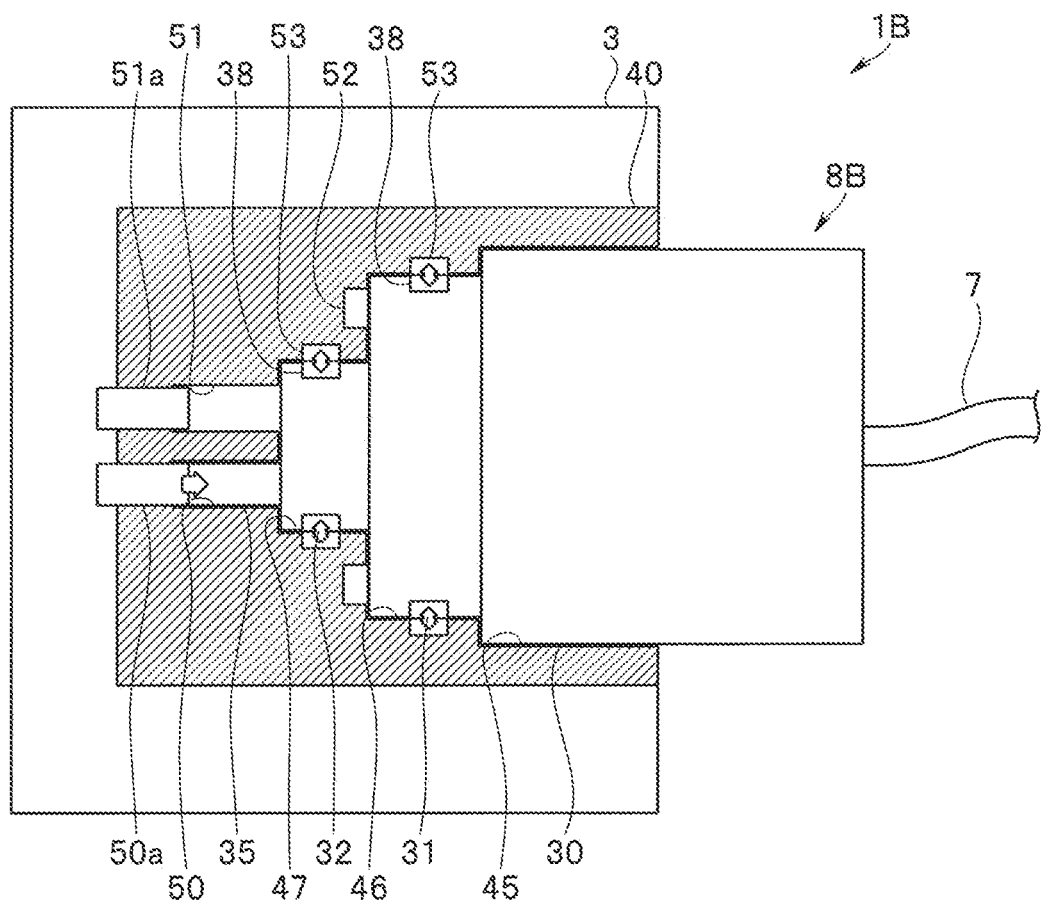
FIG. 7 is an explanatory view related to the first embodiment and showing power and signal transmission paths when the electric contact type connector for endoscope is connected to the receptacle.

Meanwhile, as shown in FIG. 7, when the second connector for endoscope 8B of the second endoscope 2B is inserted into the receptacle 40 of the endoscope processor 3, the light guide plug 35 is inserted into the light guide insertion hole 50. Thus, the end face of the light guide bundle 35a retained in the light guide plug 35 faces the end face of the light guide bundle 50a retained in the light guide insertion hole 50 so that the light guide bundle 50a and the light guide bundle 35a are optically connected. In other words, the light source can be supplied from the light guide bundle 50a to the light guide bundle 35a.

With the insertion of the second connector for endoscope 8B into the receptacle 40, the electric contacts 38 are electrically connected to the electric contacts 53 by physical contact. In other words, the electric contacts 53 can perform power feeding to and reception and transmission of various signals with the electric contacts 38.

According to such an embodiment, the endoscope processor 3 includes the receptacle 40 that allows insertion of either the first connector for endoscope 8A or the second connector for endoscope 8B, and the receptacle 40 includes the primary coil 52 that performs power feeding to the secondary coil 37 of the first connector for endoscope SA in a non-contact manner without using the electric contact, the optical fiber 51a of the optical fiber insertion hole 51 that performs signal reception and transmission with the optical fiber 36a of the optical fiber plug 36 in a non-contact manner without using the electric contact, and the electric contacts 53 that perform power feeding to and signal reception and transmission with the electric contacts 38 by contact, and the primary coil 52 and the optical fiber insertion hole 51 are provided in positions that are different from the positions of the electric contacts 53, so that the endoscope processor 3 is used in common in allowing insertion of the first endoscope 2A including the non-contact type first connector for endoscope 8A and the second endoscope 2B including the electric contact-type second connector for endoscope 8B.

In this case, the optical fiber insertion hole 51 extends in the insertion axis O direction of the first connector for endoscope 8A so that the optical fiber plug 36 inserted into the optical fiber insertion hole 51 can be caused to project in the insertion axis O direction of the first connector for endoscope 8A. Accordingly, the optical fiber 36a need not be largely bent inside the first connector for endoscope 8A so that the energy loss of the optical signal can be reduced.

Further, with the provision of at least one or more electric contacts 53 on the inner side surfaces of the first cylindrical hole 46 and the second cylindrical hole 47, when the first and the second connectors for endoscope 8A and 8B are inserted and even if a structural deviation occurs in the insertion axis O direction, the electric connection with the electric contacts 38 can stably be established.

First Modification of First Embodiment

In a case where a large-capacity image signal needs to be transmitted from the first endoscope 2A to the endoscope processor 3, the first connector for endoscope 8A may be provided with two or more optical fiber plugs 36. For example, for occasions in which a large-capacity image signal needs to be transmitted, a case in which the image pickup device provided in the distal end portion 10 of the first endoscope 2A has a high resolution, a case in which the distal end portion 10 is provided with two image pickup units to pick up a stereoscopic image of a subject, or the like can be presumed.

Figure 8:
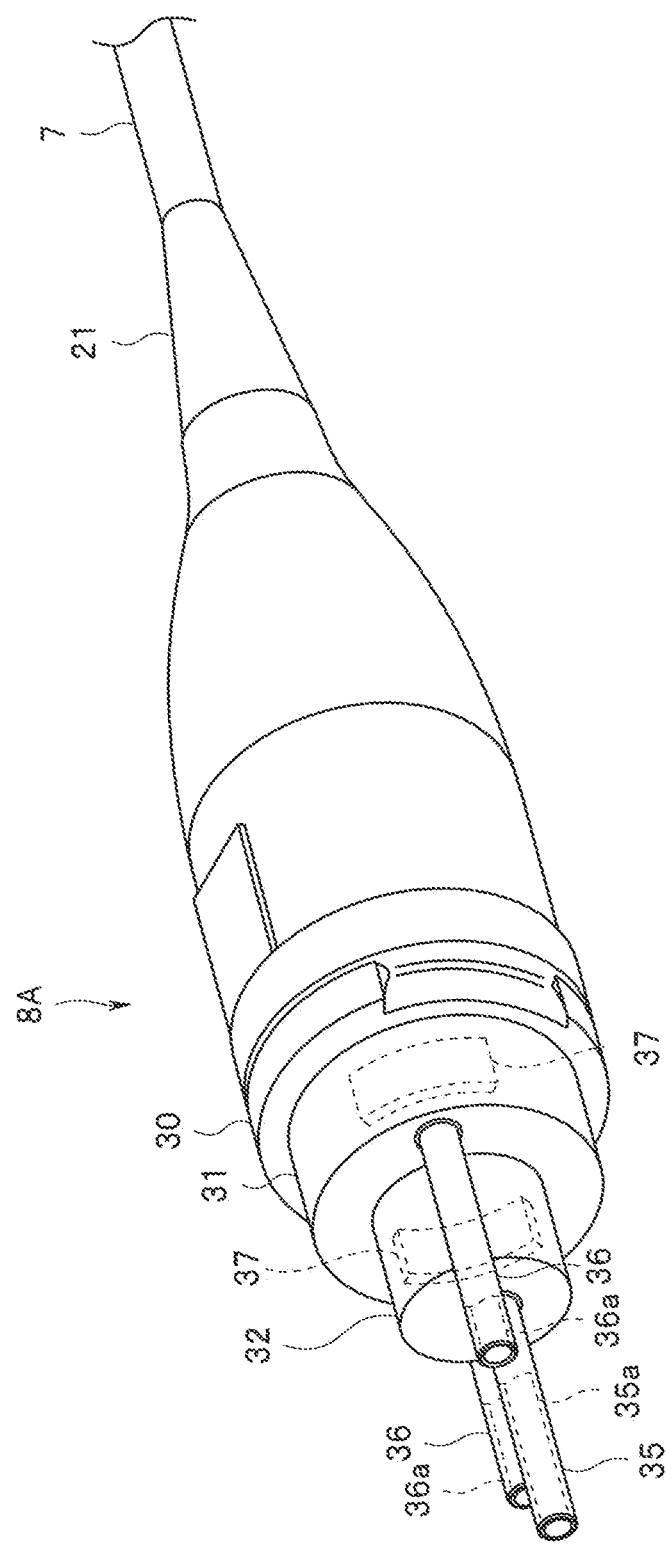
FIG. 8 is a perspective view related to a first modification of the first embodiment and showing a non-contact type connector for endoscope.
Figure 10:
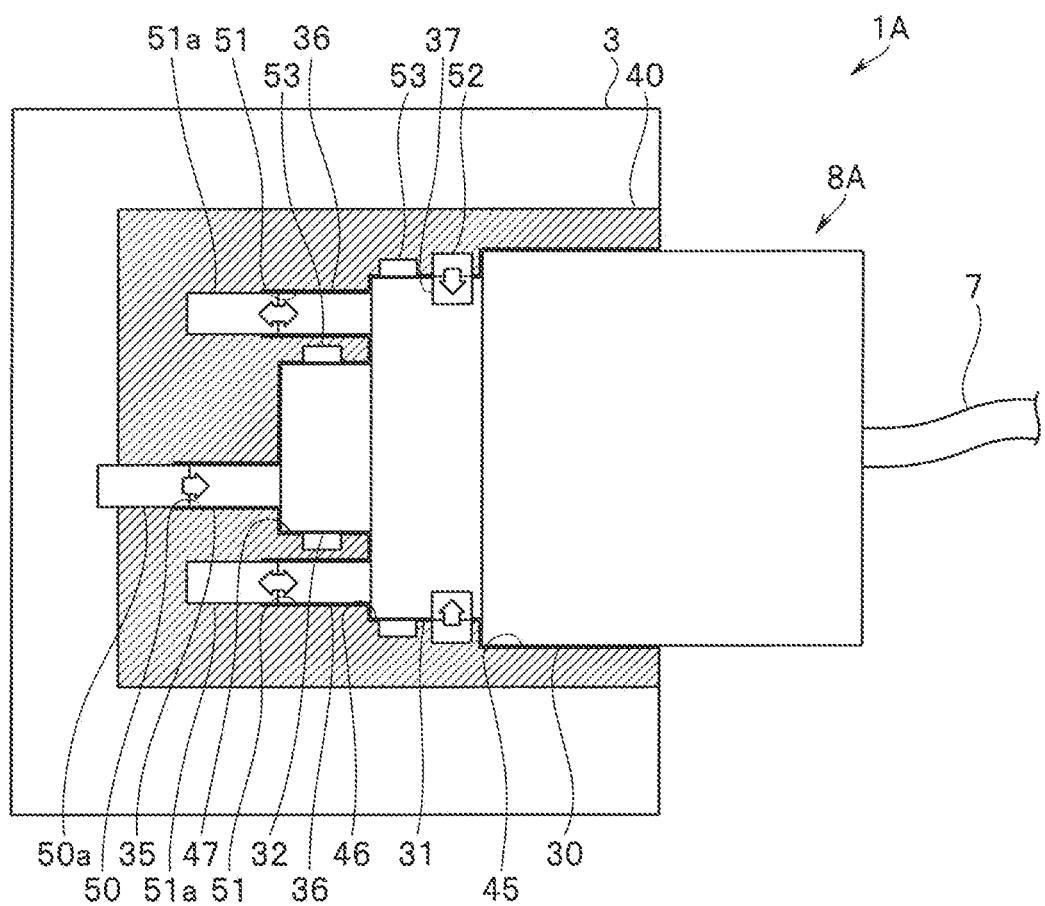
FIG. 10 is an explanatory view related to the first modification of the first embodiment and showing power and signal transmission paths when the non-contact type connector for endoscope is connected to the receptacle.
Figure 11:
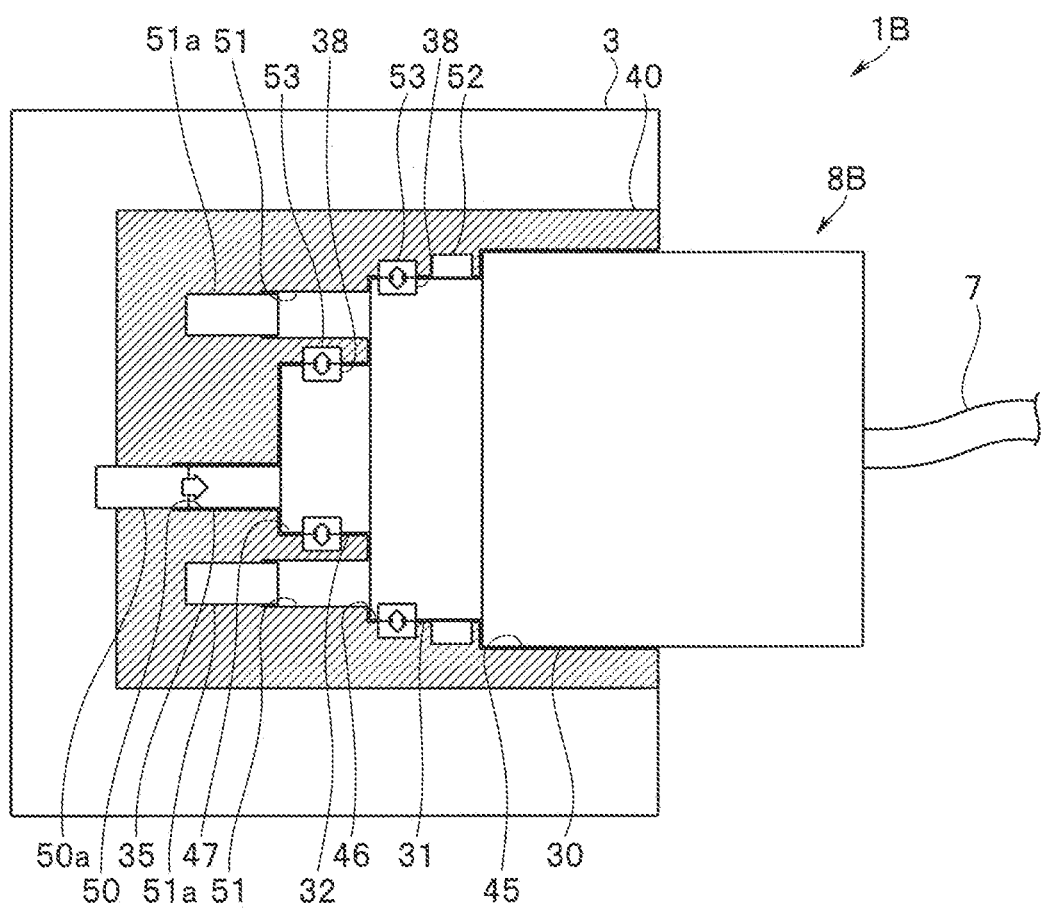
FIG. 11 is an explanatory view related to the first modification of the first embodiment and showing power and signal transmission paths when an electric contact type connector for endoscope is connected to the receptacle.

In this case, for efficient arrangement of the plurality of (for example, two) optical fiber plugs 36 in the first connector for endoscope SA, as shown in FIGS. 8, 10, and 11, for example, the optical fiber plugs 36 project from the distal end face of the first cylindrical portion 31.

In order to avoid interference with the optical fiber plug 36, the secondary coil 37 is disposed in a position along and adjacent to the outer peripheral surface (outer side surface) of the first cylindrical portion 31. Examples of the structure of the secondary coil 37 may include a structure including a rectangular substrate including an arc surface and a coil portion wound spirally or helically on the arc surface of the substrate. Note that in the present embodiment, two secondary coils 37 are arranged along the outer peripheral surface of the first cylindrical portion 31, but the number of the secondary coils 37 is not limited to two, and for example, one secondary coil 37 may be arranged along the outer peripheral surface of the first cylindrical portion 31.

Figure 9:
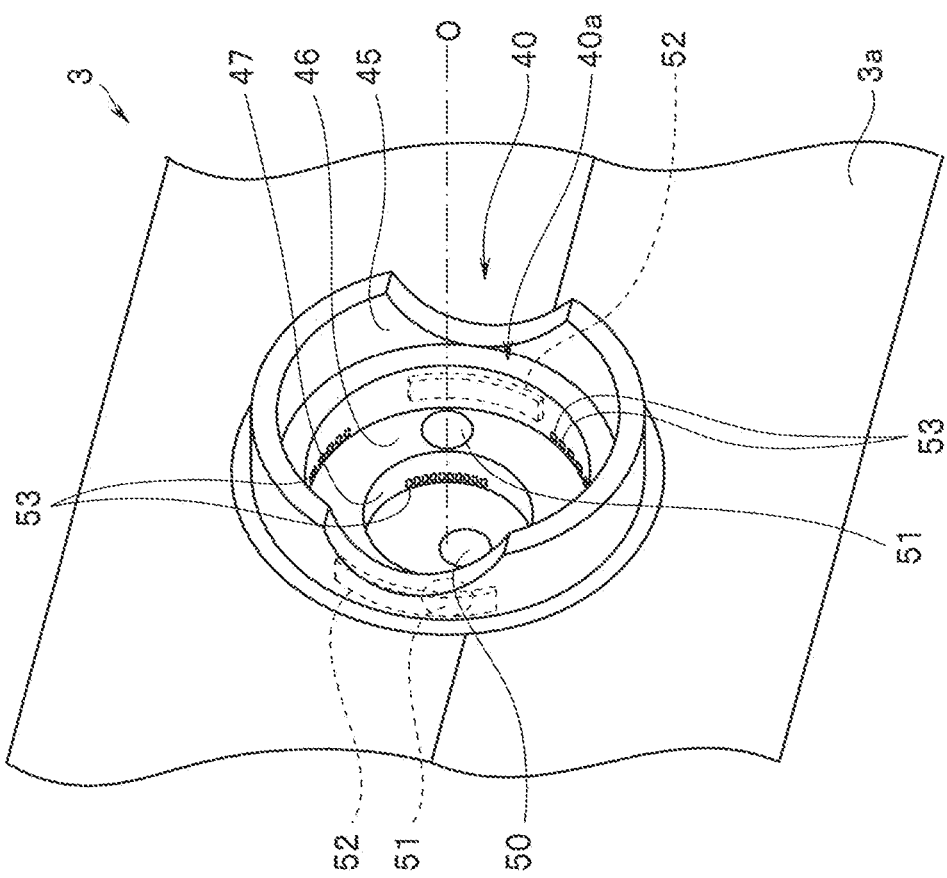
FIG. 9 is a perspective view related to the first modification of the first embodiment and showing a receptacle.

Meanwhile, as shown in FIGS. 9, 10, and 11, for example, a plurality of (for example, two) optical fiber insertion holes 51 are provided on the proximal end face of the first cylindrical hole 46 to correspond to the optical fiber plugs 36, and the optical fiber 51a is retained on the proximal end side of each of the optical fiber insertion holes 51.

The primary coil 52 is disposed in a position corresponding to the secondary coil 37 and in a position along and adjacent to the inner peripheral surface of the first cylindrical hole 46.

According to such a configuration, transmission and reception of a large-capacity signal can be performed between the first endoscope 2A and the endoscope processor 3.

Even if a structural deviation occurs in the insertion direction of the first endoscope 2A, the power can stably be fed from the endoscope processor 3 to the first endoscope 2A. In this case, with the primary coil 52 and the secondary coil 37 respectively arranged along the inner side surface of the first cylindrical hole 46 and the outer side surface of the first cylindrical portion 31, larger effective areas of the primary coil 52 and the secondary coil 37 can be secured as compared to the configuration in which the primary coil 52 and the secondary coil 37 are respectively arranged along the proximal end face of the first cylindrical hole 46 and the distal end face of the first cylindrical portion 31 so that a large-capacity power can be fed from the endoscope processor 3 to the first endoscope 2A.

Second Modification of First Embodiment

Figure 12:
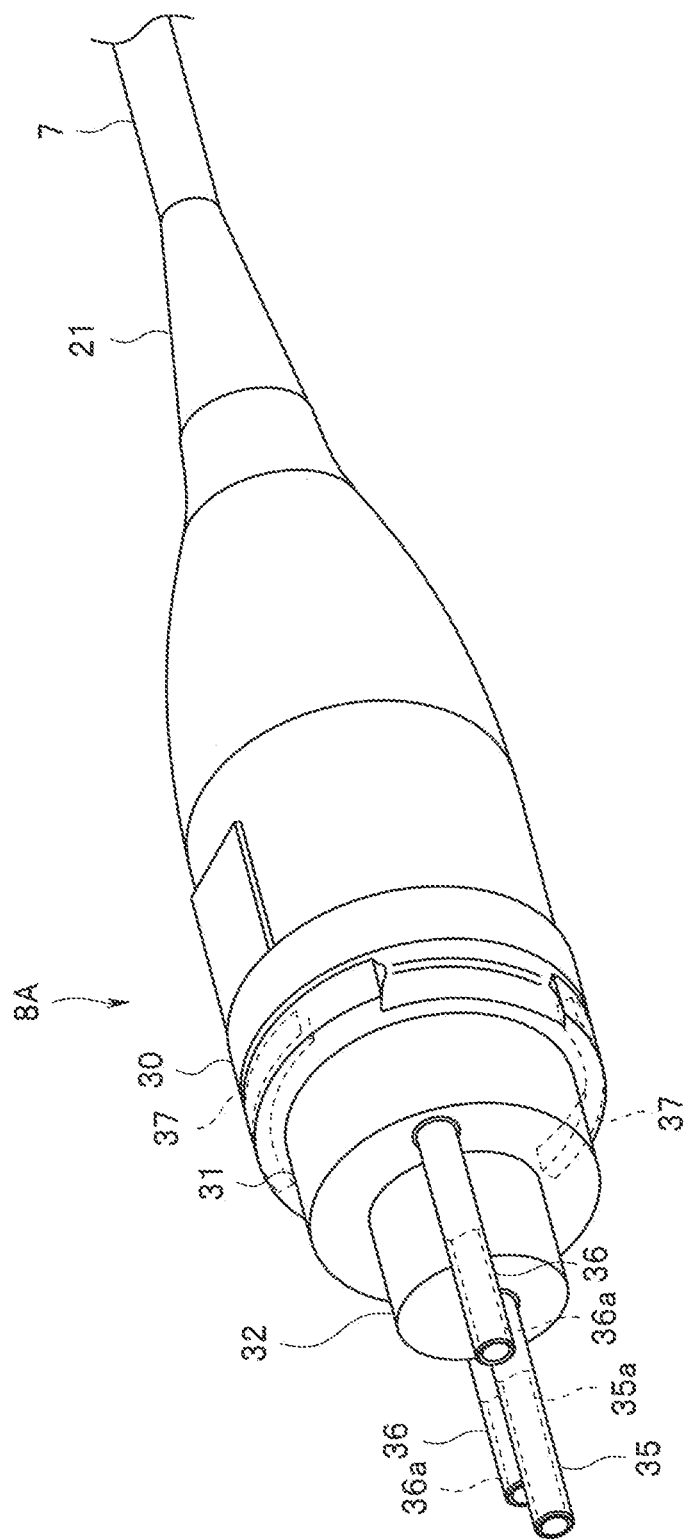
FIG. 12 is a perspective view related to a second modification of the first embodiment and showing a non-contact type connector for endoscope.
Figure 14:
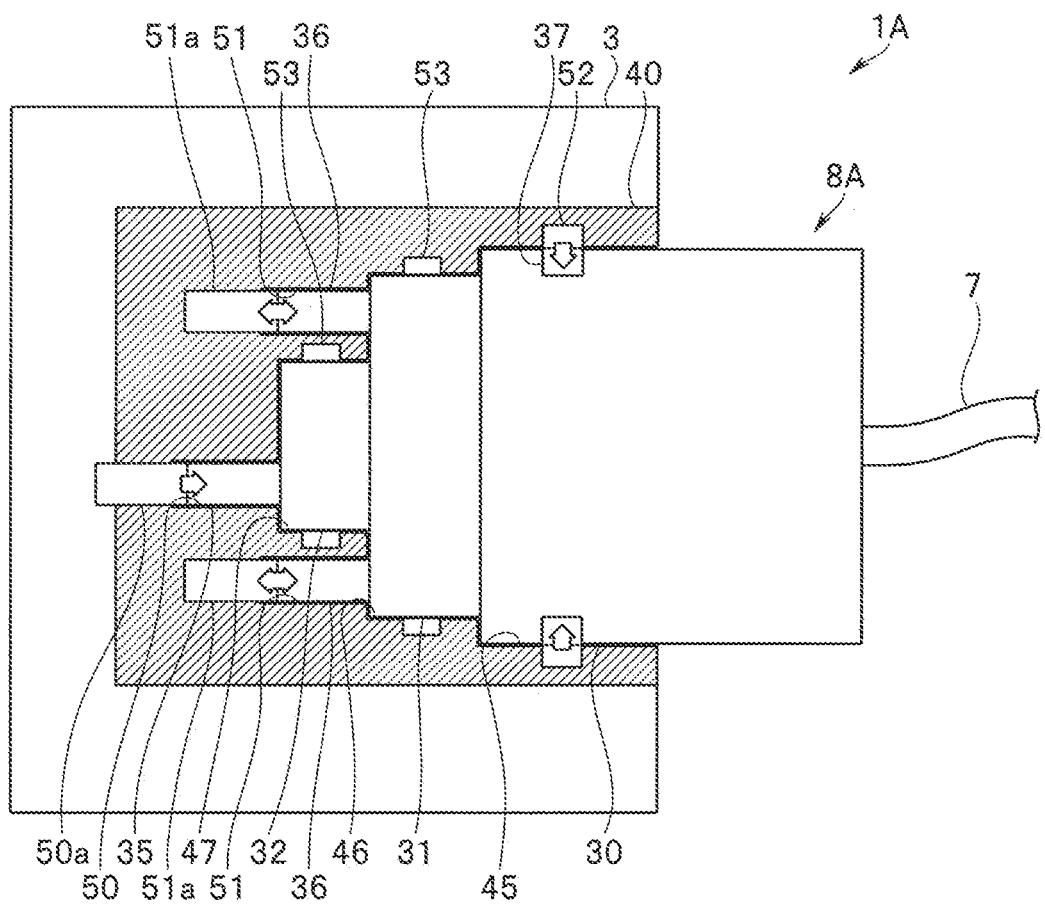
FIG. 14 is an explanatory view related to the second modification of the first embodiment and showing power and signal transmission paths when the non-contact type connector for endoscope is connected to the receptacle.
Figure 15:
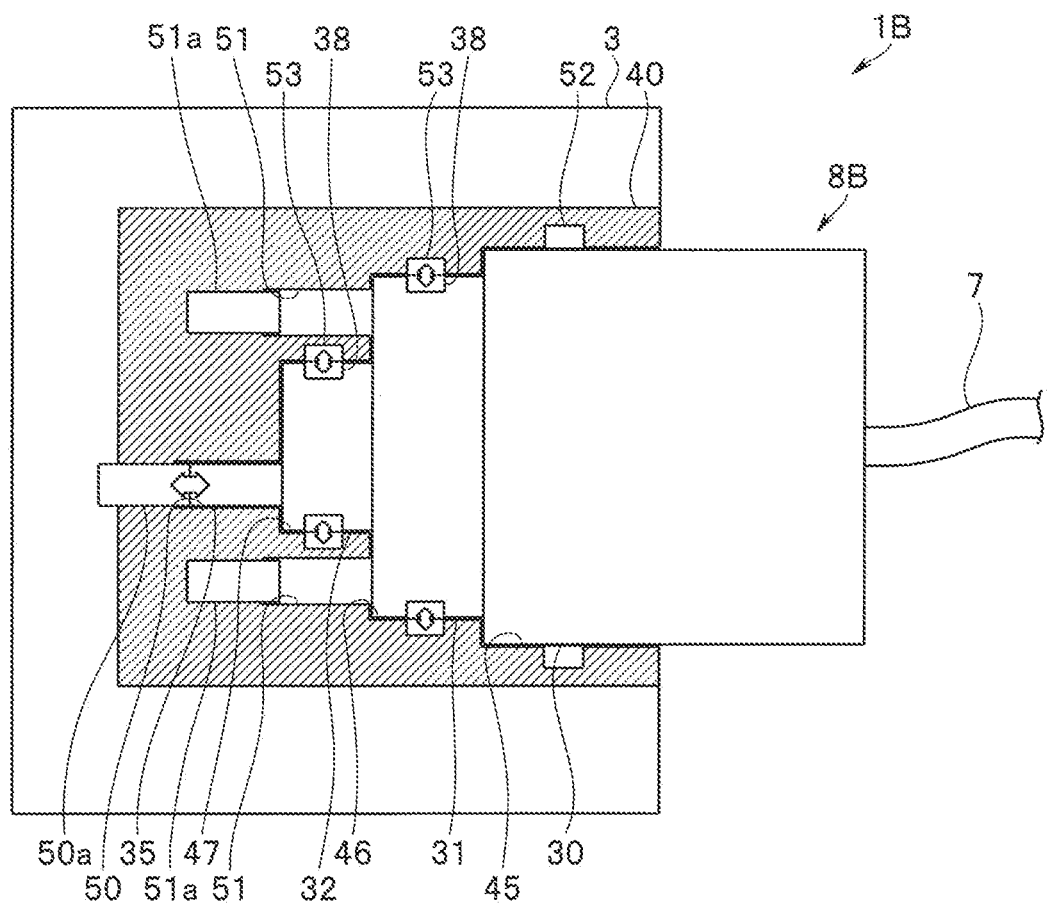
FIG. 15 is an explanatory view related to the second modification of the first embodiment and showing power and signal transmission paths when an electric contact type connector for endoscope is connected to the receptacle.

In a case where a large-capacity power is fed from the endoscope processor 3 to the first endoscope 2A, as shown in FIGS. 12, 14, and 15, for example, the secondary coil 37 can be disposed in a position along and adjacent to the outer peripheral surface (outer side surface) of the connector main body 30.

Figure 13:
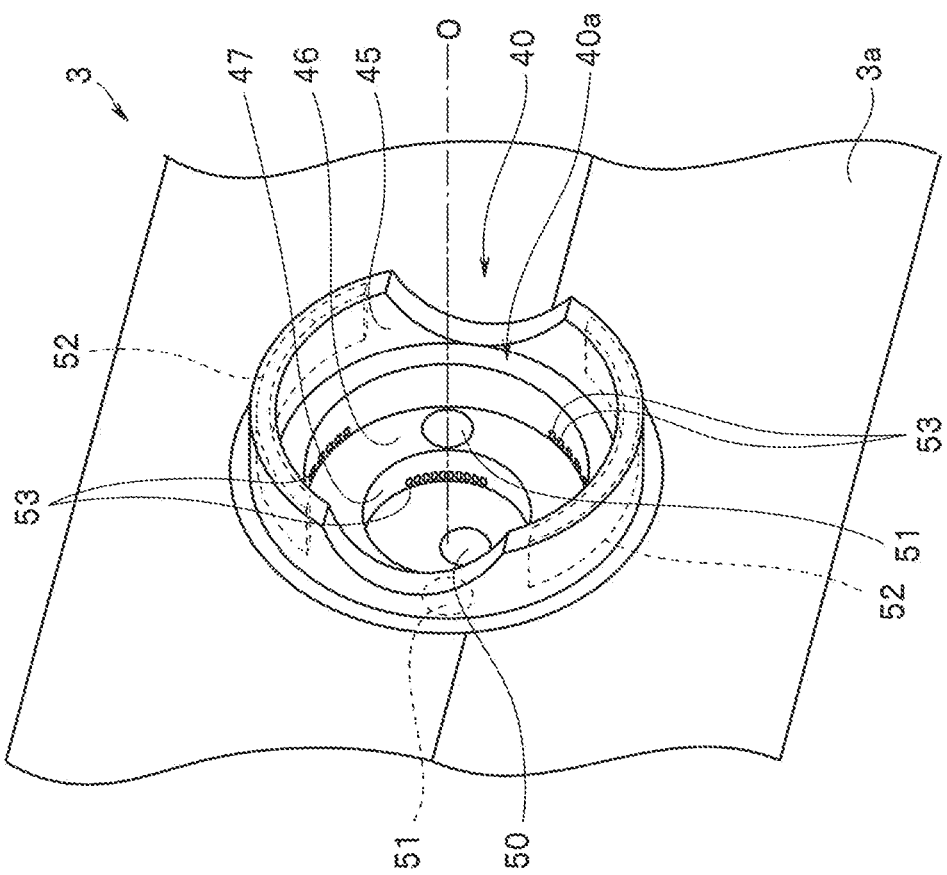
FIG. 13 is a perspective view related to the second modification of the first embodiment and showing a receptacle.

In this case, as shown in FIGS. 13, 14, and 15, the primary coil 52 is disposed in a position corresponding to the secondary coil 37 and in a position along and adjacent to the inner peripheral surface of the reception hole main body 45.

According to such a configuration, the secondary coil 37 is provided in the connector main body 30 having a larger diameter than the first cylindrical portion 31 and the second cylindrical portion 32, and the primary coil 52 is provided in the reception hole main body 45 having a larger diameter than the first cylindrical hole 46 and the second cylindrical hole 47 so that the surface areas of the primary coil 52 and the secondary coil 37 can be sufficiently secured, thus enabling a large-capacity power to be fed from the endoscope processor 3 to the first endoscope 2A.

Second Embodiment

Next, with reference to FIG. 16 to FIG. 21, a second embodiment of the present invention will be described.

The first and the second endoscopes 2A and 2B forming the first and the second endoscope systems 1A and 1B of the present embodiment differ from the aforementioned first embodiment in that the insertion portion 5 is provided with a rigid tube portion 22 in place of the flexible tube portion and the operation portion 6 is provided with a bending operation lever 23 in place of the bending operation knob.

The first and the second endoscopes 2A and 2B of the present embodiment differ from the aforementioned first embodiment in that a light source connector 60 as the first and the second connectors for endoscope 8A and 8B, and first and second signal connectors 62A and 62B connected to a signal wire 61 branched from the light source connector 60 are provided.

The endoscope processor 3 forming the endoscope systems 1A and 1B of the present embodiment differs in the configuration of a receptacle 65 from the aforementioned first embodiment.

The components having the same functions as the functions of the aforementioned first embodiment are appropriately assigned the same reference numerals and the descriptions will be omitted. Note that in the present embodiment, the light source connector 60 is connected to a light source device separate from the endoscope processor 3, but the configuration of the light source device is well known and thus, the description will be omitted.

Figure 16:
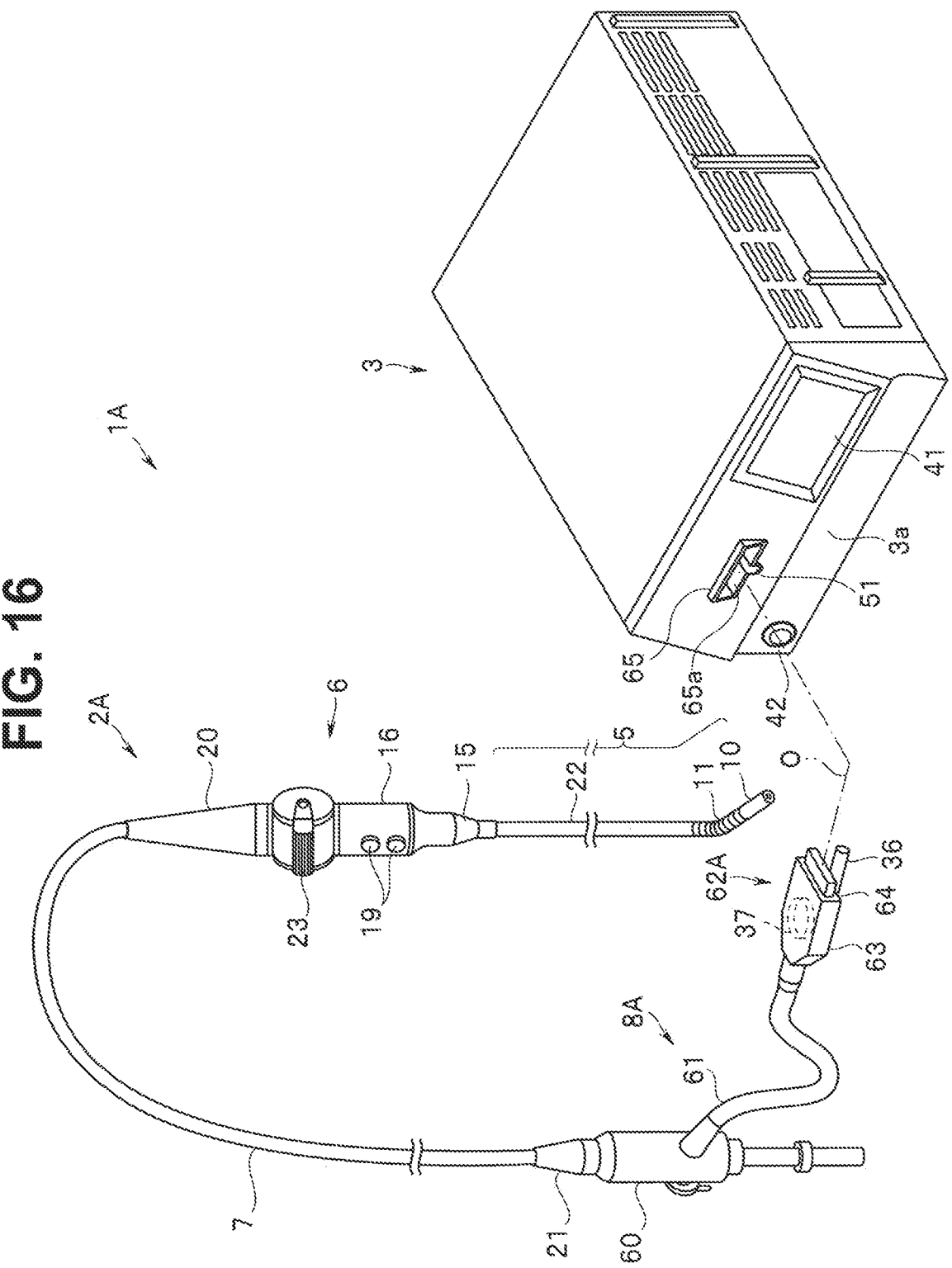
FIG. 16 is a perspective view related to a second embodiment and showing an endoscope system including an endoscope having a non-contact type connector for endoscope.
Figure 18:
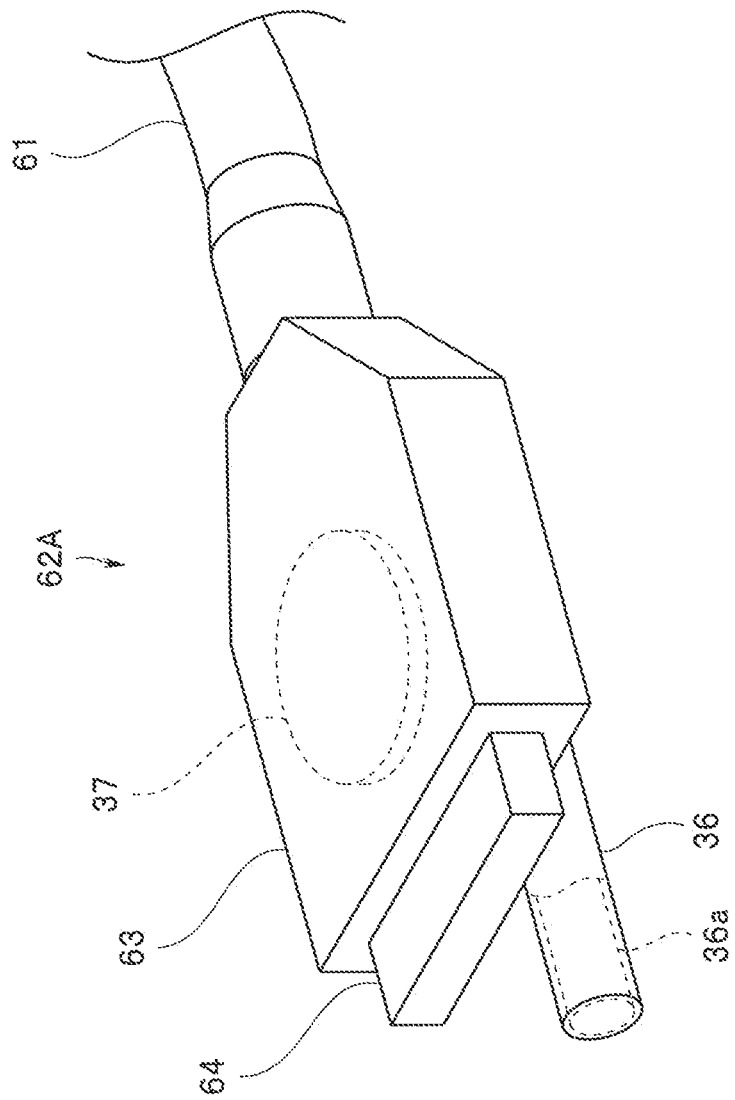
FIG. 18 is a perspective view related to the second embodiment and showing the non-contact type connector for endoscope.

As shown in FIGS. 16 and 18, the first signal connector 62A forming the first endoscope 2A includes a connector main body 63 in a flat and substantially square tube shape and a projecting portion 64 in a flat and substantially cuboid shape projecting from the distal end face of the connector main body 63. The following descriptions will be made by defining the direction orthogonal to one pair of surfaces formed with a relatively large area of the two pairs of surfaces forming the outer peripheral surface of the connector main body 63 as the up-down direction and the direction orthogonal to one pair of surfaces formed with a relatively small area as the left-right direction.

Note that in the first connector for endoscope 8A, the projecting portion 64 provided in the first signal connector 62A is a dummy provided to allow the basic shape of the first signal connector 62A to correspond to the basic shape of the second signal connector 62B, which will be described later, and may appropriately be omitted.

The secondary coil 37 is provided in a position along and adjacent to the upper surface of the connector main body 63 inside the connector main body 63. In other words, the first signal connector 62A includes, as a non-contact type power receiving member without using the electric contact, the secondary coil 37 on the upper surface side inside the connector main body 63.

The optical fiber plug 36 projects from the lower surface of the connector main body 63. The optical fiber plug 36 is gently bent in an intermediate portion, and then extends in the insertion axis O direction. In other words, the first signal connector 62A includes, as a non-contact type signal transmitting and receiving member without using the electric contact, the optical fiber plug 36 retaining the optical fiber 36a on the lower surface side of the connector main body 63.

Figure 17:
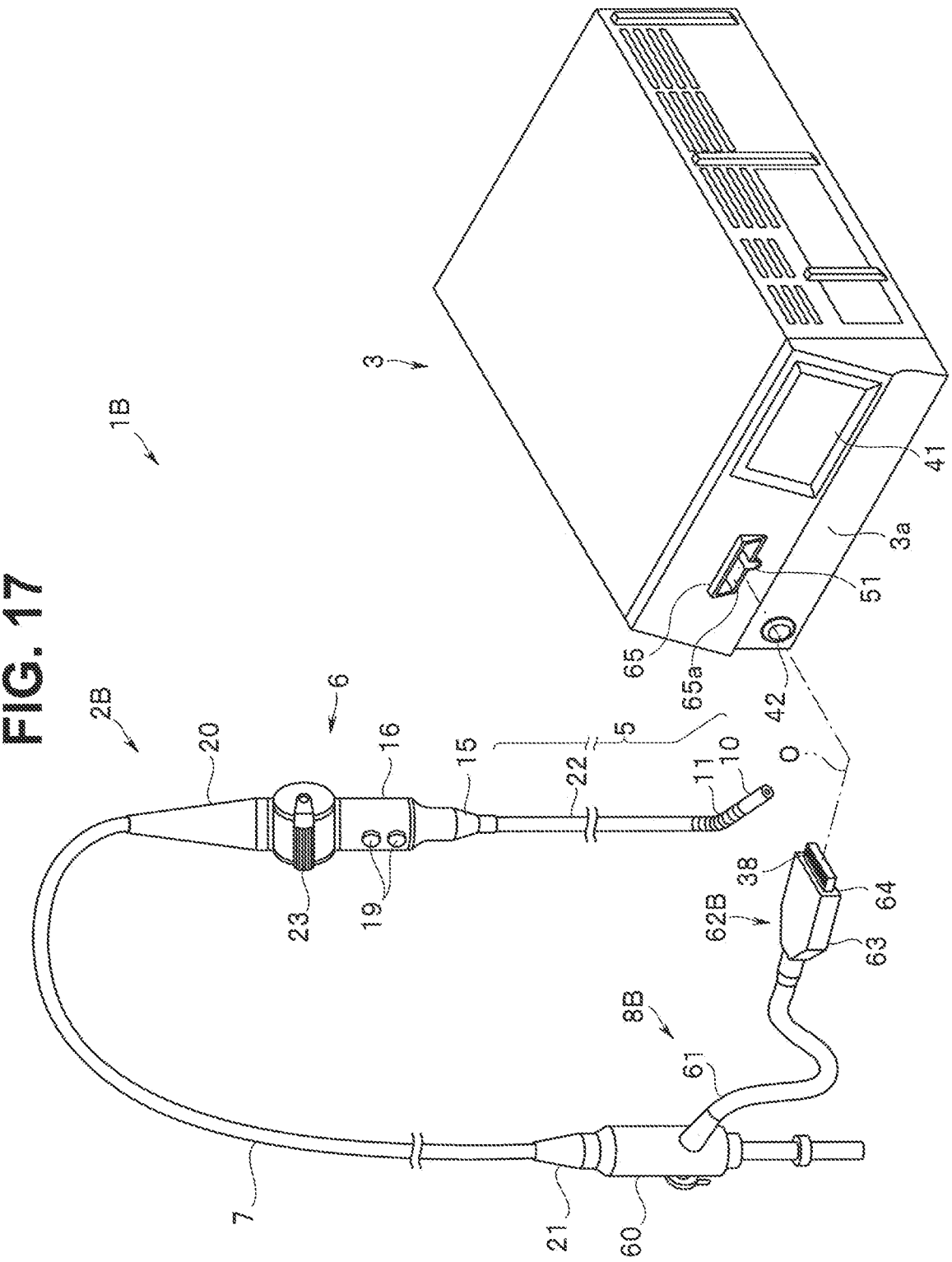
FIG. 17 is a perspective view related to the second embodiment and showing an endoscope system including an endoscope having an electric contact-type connector for endoscope.
Figure 19:
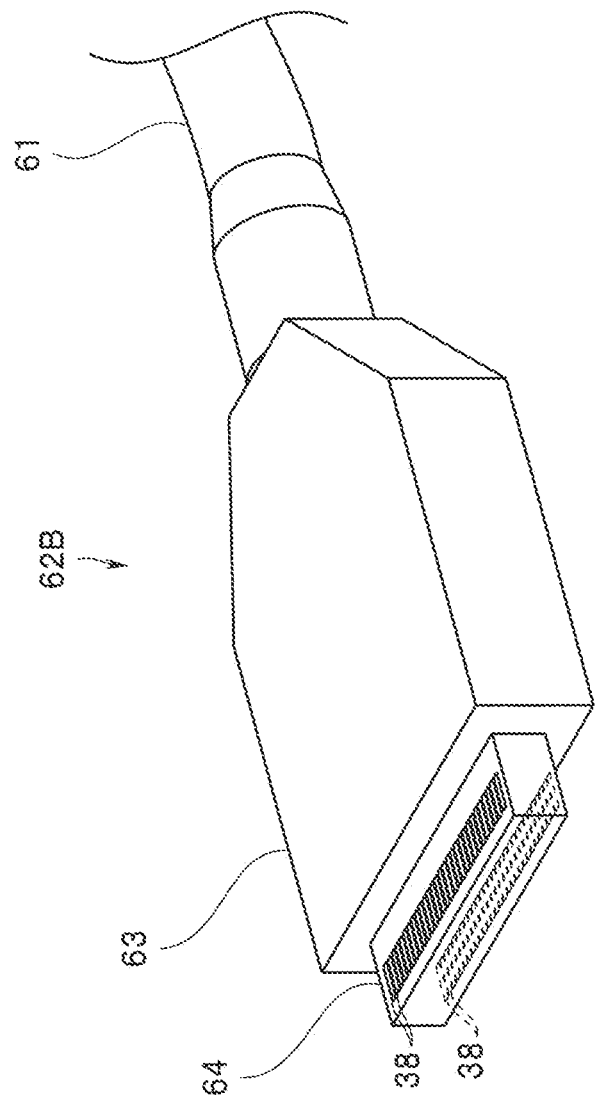
FIG. 19 is a perspective view related to the second embodiment and showing the electric contact type connector for endoscope.

As shown in FIGS. 17 and 19, for example, the second signal connector 62B forming the second endoscope 2B includes the connector main body 63 in a flat and substantially square tube shape and the projecting portion 64 in a flat and substantially cuboid shape projecting from the distal end face of the connector main body 63.

At least one or more (in the present embodiment, a plurality of) electric contacts 38 are provided on the upper surface and the lower surface of the projecting portion 64 of the second signal connector 62B. Of the electric contacts 38, some electric contacts 38 are electric contacts for power and are connected to power wiring (not shown) inside the second signal connector 62B. The other electric contacts 38 are electric contacts for an image signal and a control signal and are connected to signal wiring including metal wiring (not shown) inside the second signal connector 62B. In other words, the second signal connector 62B includes, as a scope-side electric contact, at least one or more electric contacts 38 on the upper surface and the lower surface of the projecting portion 64.

Figure 20:
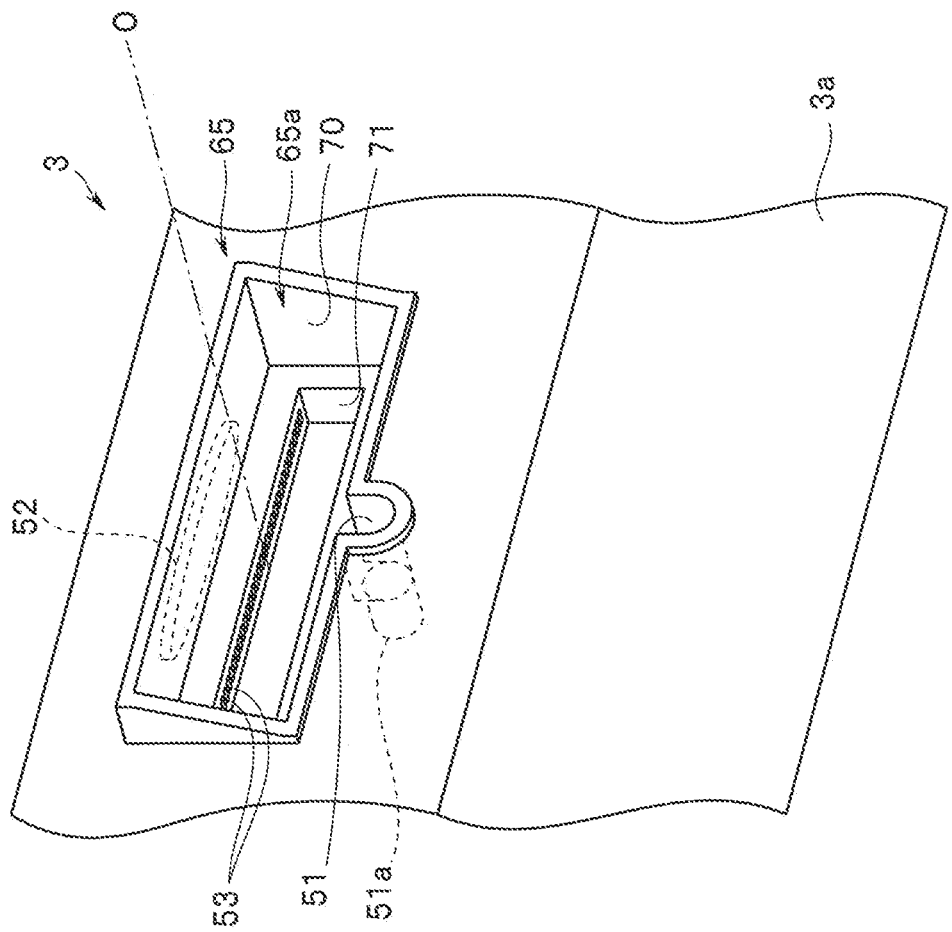
FIG. 20 is a perspective view related to the second embodiment and showing a receptacle.

As shown in FIG. 20, the endoscope processor 3 includes the receptacle 65 on the front face 3a, as a connector receiver to which either the first signal connector 62A or the second signal connector 62B is connectable.

The receptacle 65 includes a connector reception hole 65a that allows insertion of either the first signal connector 62A or the second signal connector 62B. The connector reception hole 65a includes a reception hole main body 70 in a flat and substantially square tube shape and a flat square tube hole 71 provided in a recessed manner on the proximal end face of the reception hole main body 70. In other words, the reception hole main body 70 is formed with the upper surface and the lower surface as a first inner side planar surface and a second inner side planar surface that are wider than the left and right surfaces and are arranged parallel to each other.

The reception hole main body 70 is in a shape that allows insertion of the connector main body 63 and the square tube hole 71 is in a shape that allows insertion of the projecting portion 64.

The optical fiber insertion hole 51 is integrally formed on the bottom surface (second inner side planar surface) of the reception hole main body 70. The optical fiber insertion hole 51 is, for example, a hole portion extending in the insertion axis O direction. The optical fiber insertion hole 51 is provided in a position corresponding to the optical fiber plug 36 projecting from the first signal connector 62A. The optical fiber 51a is provided on the proximal end side inside the optical fiber insertion hole 51. In other words, the receptacle 65 includes, as anon-contact type signal receiving and transmitting member without using the electric contact, the optical fiber insertion hole 51 retaining the optical fiber 51a in a lower portion of the reception hole main body 70.

The primary coil 52 is provided in a position along and adjacent to the upper surface (first inner side planar surface) of the connector reception hole 71 inside the receptacle 65. The primary coil 52 is provided in a position adjacently facing the secondary coil 37 when the first signal connector 62A is inserted into the receptacle 65. Thus, the primary coil 52 is electromagnetically connected to the secondary coil 37 so that power can be fed to the secondary coil 37. In other words, the receptacle 65 includes, as a non-contact type power feeding member without using the electric contact, the primary coil 52 near the upper surface of the reception hole main body 70.

At least one or more (in the present embodiment, a plurality of) electric contacts 53 are provided on the upper surface and the lower surface of the square tube hole 71 inside the receptacle 65. The electric contacts 53 are provided in positions corresponding to the respective electric contacts 38 of the second signal connector 62B. Of the electric contacts 53, some electric contacts 53 are electric contacts for power. The other electric contacts 53 are electric contacts for an image signal and a control signal. When the second signal connector 62B is inserted into the receptacle 65, the electric contacts 53 are electrically connected to the respective electric contacts 38 by physical contact. Thus, the electric contacts 53 can perform power feeding to and reception and transmission of various signals with the respective electric contacts 38. In other words, the receptacle 65 includes, as a processor-side electric contact for performing power feeding to and signal reception and transmission with the electric contacts 38 by contact, at least one or more electric contacts 53 on the upper surface and the lower surface of the square tube hole 71.

Thus, the electric contacts 53 for electric connection with the second signal connector 62B are provided in positions that are different from the positions of the optical fiber insertion hole 51 and the primary coil 52 inside the receptacle 65.

Figure 21:
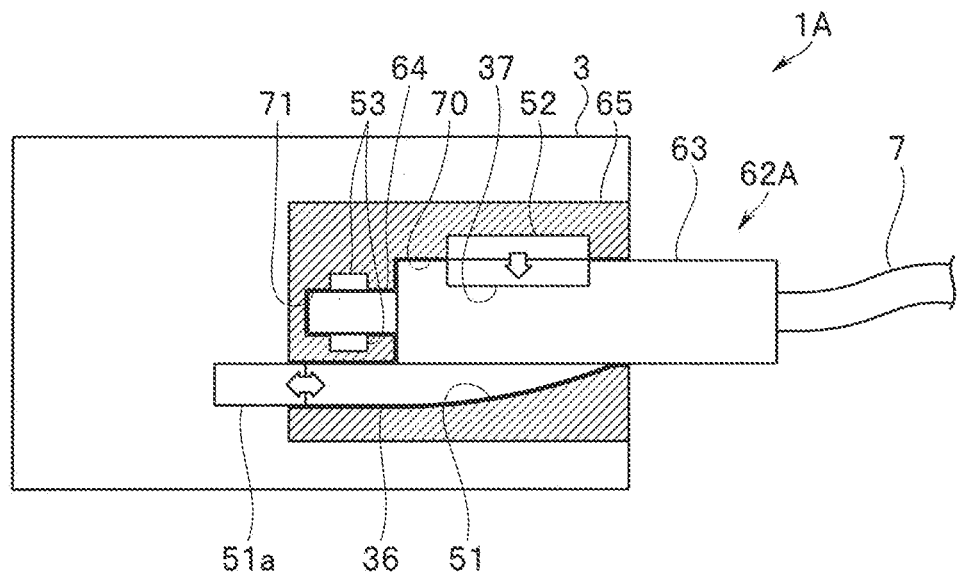
FIG. 21 is an explanatory view related to the second embodiment and showing power and signal transmission paths when the non-contact type connector for endoscope is connected to the receptacle.

In such a configuration, as shown in FIG. 21, with the insertion of the first signal connector 62A of the first endoscope 2A into the receptacle 65 of the endoscope processor 3, the optical fiber plug 36 is inserted into the optical fiber insertion hole 51. Thus, the end face of the optical fiber 36a retained in the optical fiber plug 36 faces the end face of the optical fiber 51a retained in the optical fiber insertion hole 51 so that the optical fiber 51a and the optical fiber 36a are optically connected. In other words, various signals can be transmitted and received between the optical fiber 36a and the optical fiber 51n in a non-contact manner without using the electric contact.

With the insertion of the first signal connector 62A into the receptacle 40, the secondary coil 37 faces adjacently the primary coil 52 so that the primary coil 52 and the secondary coil 37 are electromagnetically connected. In other words, power can be fed from the primary coil 52 to the secondary coil 37 in a non-contact manner without using the electric contact.

Figure 22:
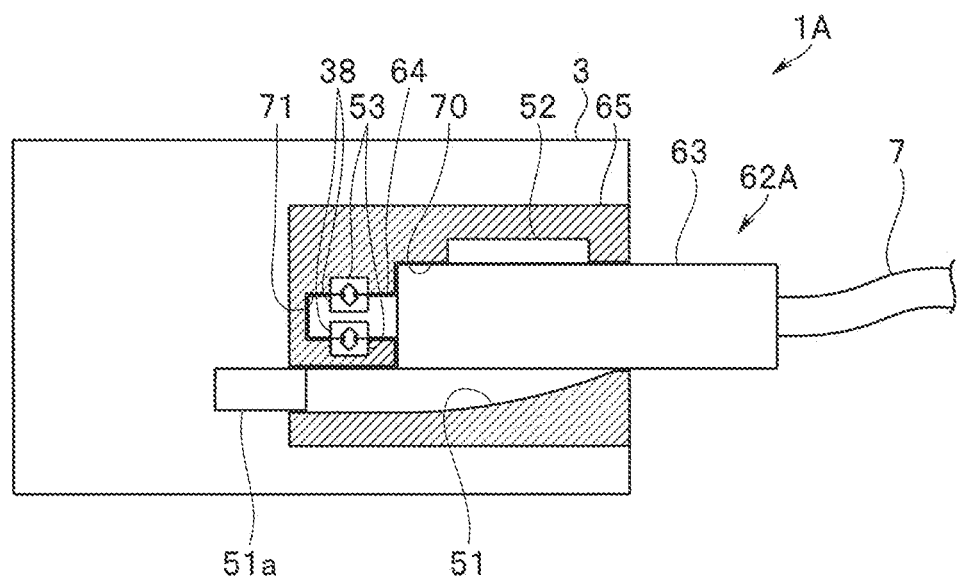
FIG. 22 is an explanatory view related to the second embodiment and showing power and signal transmission paths when the electric contact type connector for endoscope is connected to the receptacle.

Meanwhile, as shown in FIG. 22, when the second signal connector 62B of the second endoscope 2B is inserted into the receptacle 65 of the endoscope processor 3, the electric contacts 38 are electrically connected to the electric contacts 53 by physical contact. In other words, the electric contacts 53 can perform power feeding to and reception and transmission of various signals with the electric contacts 38.

According to such an embodiment, the same advantageous effects as the advantageous effects of the aforementioned first embodiment can be produced.

First Modification of Second Embodiment

In a case where a large-capacity image signal needs to be transmitted from the first endoscope 2A to the endoscope processor 3, the first signal connector 62A may be provided with two or more optical fiber plugs 36.

Figure 23:
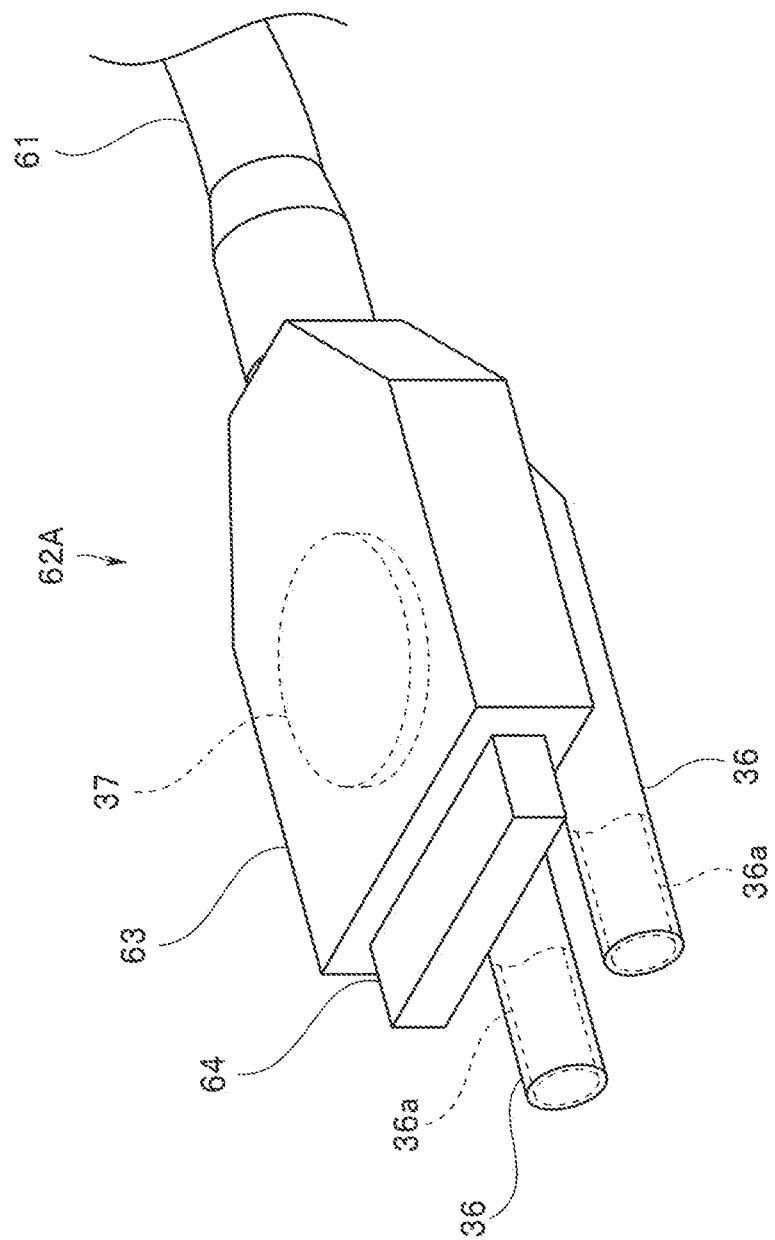
FIG. 23 is a perspective view related to a first modification of the second embodiment and showing a non-contact type connector for endoscope.

In this case, for efficient arrangement of the plurality of (for example, two) optical fiber plugs 36 in the first signal connector 62A, as shown in FIG. 23, for example, the optical fiber plugs 36 project from the lower surface of the connector main body 63.

Figure 24:
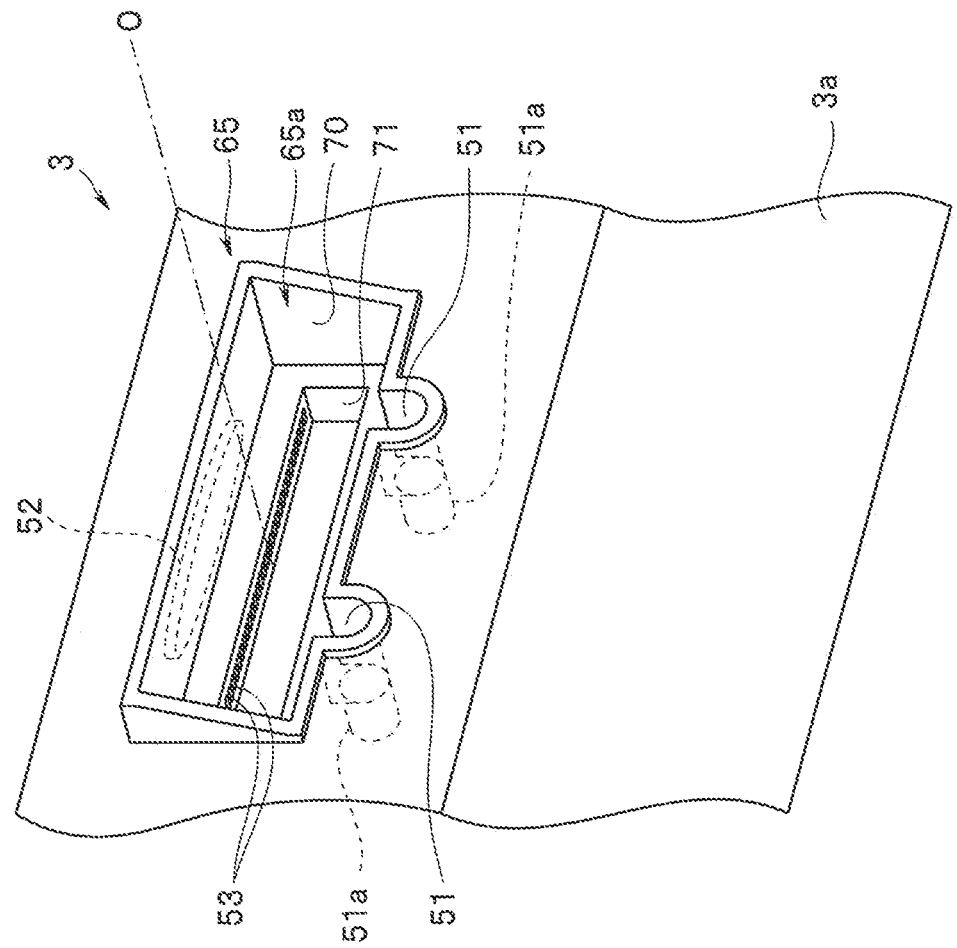
FIG. 24 is a perspective view related to the first modification of the second embodiment and showing a receptacle.

Meanwhile, as shown in FIG. 24, for example, the optical fiber insertion hole 51 is integrally formed in a lower portion of the reception hole main body 70 of the receptacle 65.

According to such a configuration, transmission and reception of a large-capacity signal can be performed between the first endoscope 2A and the endoscope processor 3.

Third Embodiment

Next, with reference to FIG. 25 to FIG. 29, a third embodiment of the present invention will be described.

The present embodiment is mainly different from the aforementioned first embodiment in that the components for performing transmission and reception of various signals and power transfer between the first and the second endoscopes 2A and 2B, and the endoscope processor 3 are integrated on the distal end faces of the first and the second connectors for endoscope 8A and 8B and the proximal end face of the receptacle 40. The components similar to the components of the aforementioned first embodiment are assigned the same reference numerals and the descriptions will be omitted.

Figure 25:
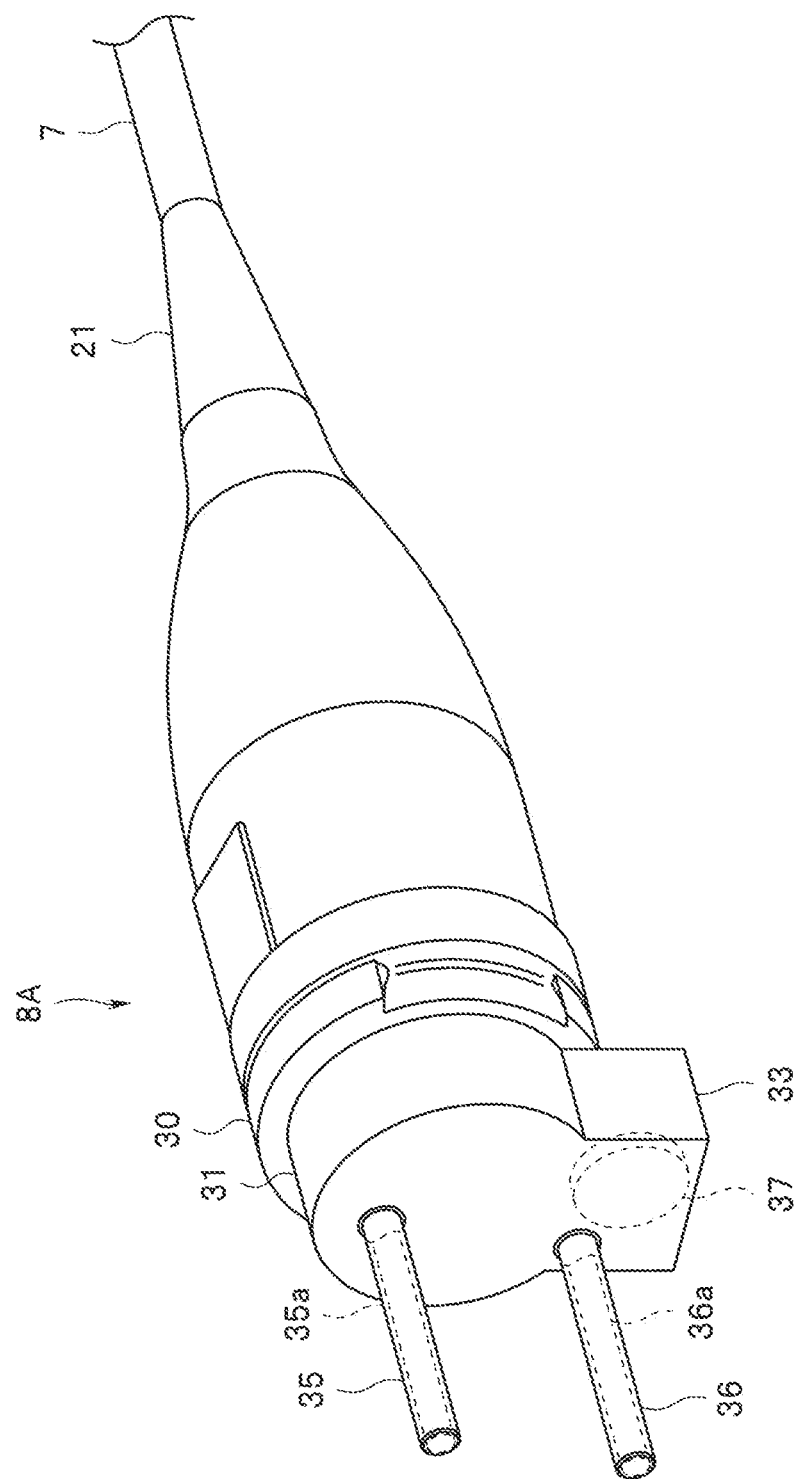
FIG. 25 is a perspective view related to a third embodiment and showing a non-contact type connector for endoscope.

As shown in FIG. 25, the first connector for endoscope 8A includes the substantially cylindrical connector main body 30, the cylindrical portion 31 provided in a projecting manner on the distal end face of the connector main body 30, and a square tube portion 33 provided in a projecting manner on the side portion of the cylindrical portion 31.

The light guide plug 35 projects from the distal end face of the cylindrical portion 31 in the insertion axis O direction of the first connector for endoscope 8A.

The optical fiber plug 36 projects from the distal end face of the square tube portion 33 in the insertion axis O direction of the first connector for endoscope 8A. In other words, the first connector for endoscope 8A includes, as a non-contact type signal transmitting and receiving member, the optical fiber plug 36 retaining the optical fiber 36a on the distal end face of the square tube portion 33.

The secondary coil 37 is provided in a position along and adjacent to the distal end face of the square tube portion 33 inside the square tube portion 33. In other words, the first connector for endoscope 8A includes, as a non-contact type power receiving member, the secondary coil 37 inside the square tube portion 33.

Figure 26:
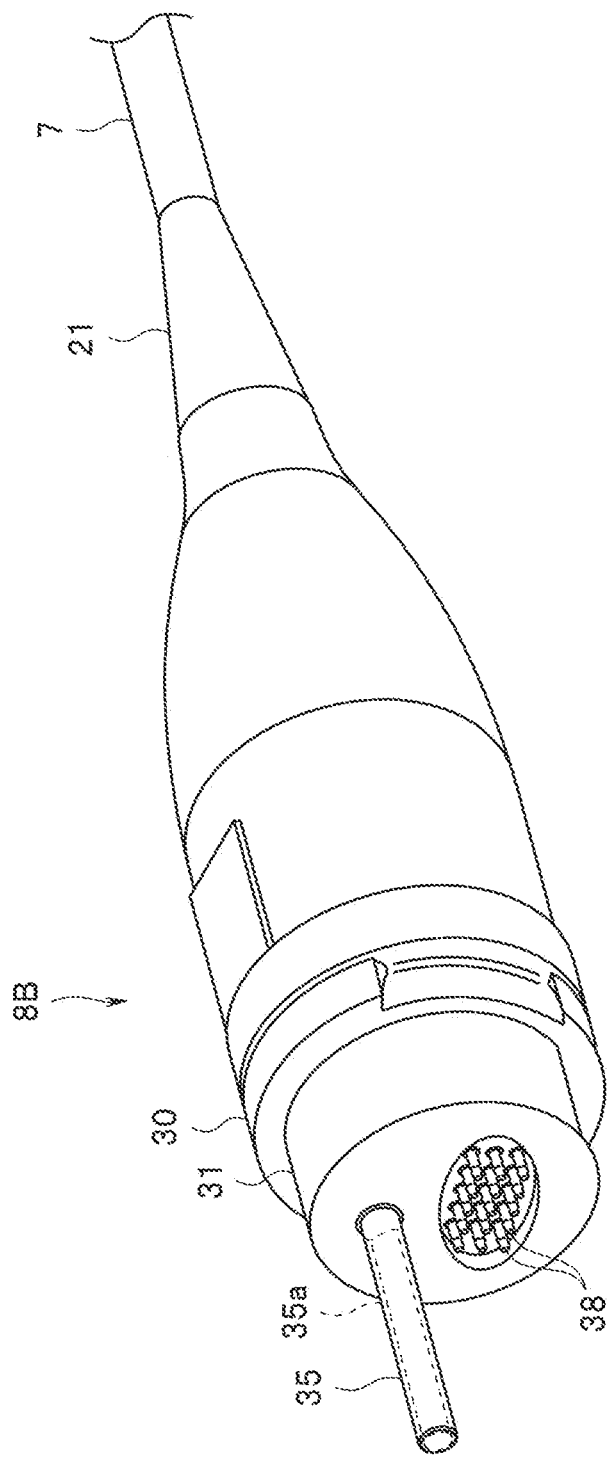
FIG. 26 is a perspective view related to the third embodiment and showing an electric contact type connector for endoscope.

Meanwhile, as shown in FIG. 26, the second connector for endoscope 8B includes the substantially cylindrical connector main body 30 and the cylindrical portion 31 provided in a projecting manner on the distal end face of the connector main body 30.

The light guide plug 35 projects from the distal end face of the cylindrical portion 31 in the insertion axis O direction of the second connector for endoscope 8B.

At least one or more (in the present embodiment, a plurality of) electric contacts 38 are provided on the distal end face of the cylindrical portion 31. Of the electric contacts 38, some electric contacts 38 are electric contacts for power and the other electric contacts 38 are electric contacts for an image signal and a control signal. In other words, the second connector for endoscope 8B includes, as a scope-side electric contact, at least one or more electric contacts 38 on the distal end face of the cylindrical portion 31.

The positions where the plurality of electric contacts 38 are provided in the second connector for endoscope 8B are set to be different from the positions where the optical fiber plug 36 and the secondary coil 37 are provided in the aforementioned first connector for endoscope 8A. Meanwhile, the position where the light guide plug 35 is provided in the second connector for endoscope 8B is set to correspond to the position where the light guide plug 35 is provided in the first connector for endoscope 8A.

Figure 27:
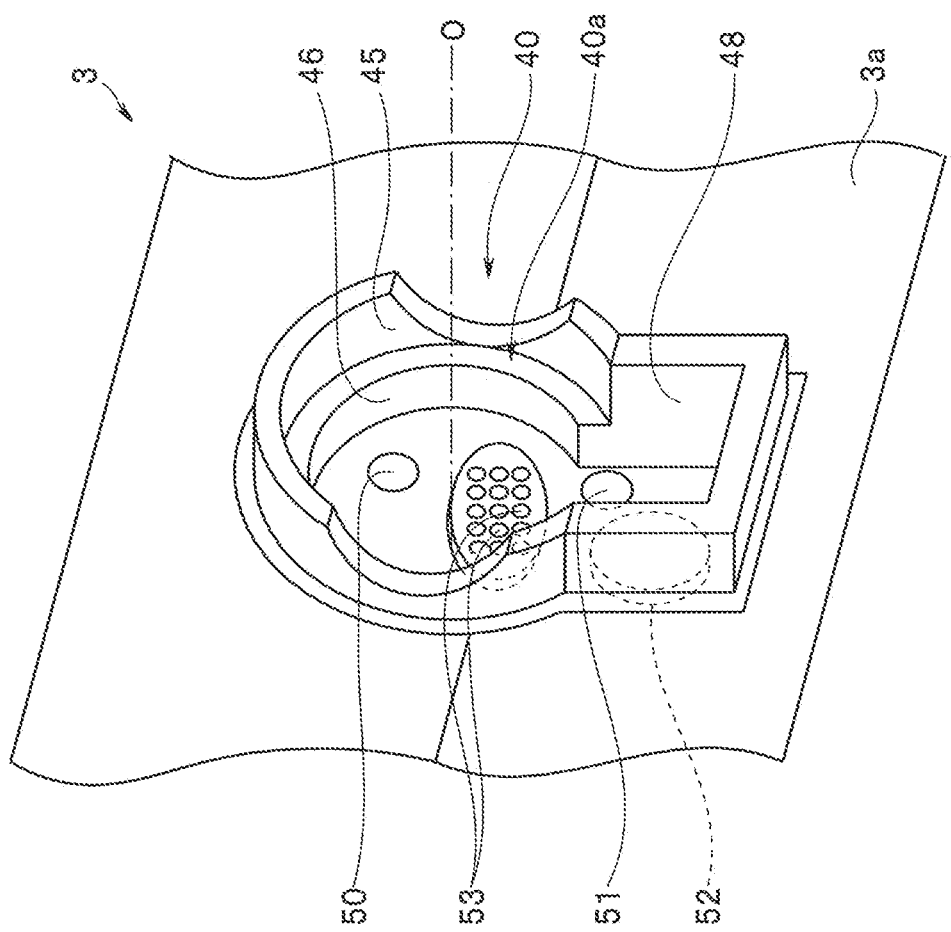
FIG. 27 is a perspective view related to the third embodiment and showing a receptacle.

As shown in FIG. 27, the endoscope processor 3 includes, on the front face 3a, the receptacle 40 as a connector receiver to which either the first connector for endoscope 8A or the second connector for endoscope 8B is connectable.

The receptacle 40 includes the connector reception hole 40a that allows insertion of either the first connector for endoscope 8A or the second connector for endoscope 8B.

The connector reception hole 40a includes the substantially cylindrical reception hole main body 45, the cylindrical hole 46 provided in a recessed manner on the proximal end face of the reception hole main body 45, and a square tube hole 48 provided continuously with a lower portion of the reception hole main body 45.

The reception hole main body 45 and the cylindrical hole 46 are in a shape that allows insertion of the connector main body 30 and the cylindrical portion 31 of the first connector for endoscope 8A and the second connector for endoscope 8B. The square tube hole 48 is in a shape that allows insertion of the square tube portion 33 of the first connector for endoscope 8A.

The light guide insertion hole 50 that allows insertion of the light guide plug 35 and at least one or more (in the present embodiment, a plurality of) electric contacts 53 are provided on the proximal end face of the cylindrical hole 46.

The light guide bundle 50a is optically connected to the light source, such as a halogen lamp, inside the endoscope processor 3. When the light guide plug 35 is inserted into the light guide insertion hole 50, the light guide bundle 35a inside the light guide plug 35 and the light guide bundle 50a inside the light guide insertion hole 50 are positioned so that the optical axes correspond to each other. Thus, the light guide bundle 50a is optically connected to the light guide bundle 35a so that the illumination light from the light source can be supplied to the light guide bundle 35a.

When the second connector for endoscope SB is inserted into the receptacle 40, the electric contacts 53 are electrically connected to the respective electric contacts 38 by physical contact. Thus, the electric contacts 53 can perform power feeding to and reception and transmission of various signals with the respective electric contacts 38. In other words, the receptacle 40 includes, as a processor-side electric contact to perform power feeding to and reception and transmission of signals with the electric contacts 38 by contact, at least one or more electric contacts 53 on the proximal end face of the cylindrical hole 46.

The optical fiber insertion hole 51 that allows insertion of the optical fiber plug 36 is provided on the proximal end face of the square tube hole 48.

When the optical fiber plug 36 is inserted into the optical fiber insertion hole 51, the optical fiber 36a inside the optical fiber plug 36 and the optical fiber 51a inside the optical fiber insertion hole 51 are positioned so that the optical axes correspond to each other. Thus, the optical fiber 51a is optically connected to the optical fiber 36a and can perform reception and transmission of various signals with the optical fiber 36a. In other words, the receptacle 40 includes, as a non-contact type signal receiving and transmitting member without using the electric contact, the optical fiber insertion hole 51 retaining the optical fiber 51a on the proximal end face of the square tube hole 48.

The primary coil 52 is provided in a position along and adjacent to the proximal end face of the square tube hole 48 inside the receptacle 40. The primary coil 52 is provided in a position adjacently facing the secondary coil 37 when the first connector for endoscope 8A is inserted into the receptacle 40. Thus, the primary coil 52 is electromagnetically connected to the secondary coil 37 so that power can be fed to the secondary coil 37. In other words, the receptacle 40 includes, as a non-contact type power feeding member without using the electric contact, the primary coil 52 near the proximal end face of the square tube hole 48.

Figure 28:
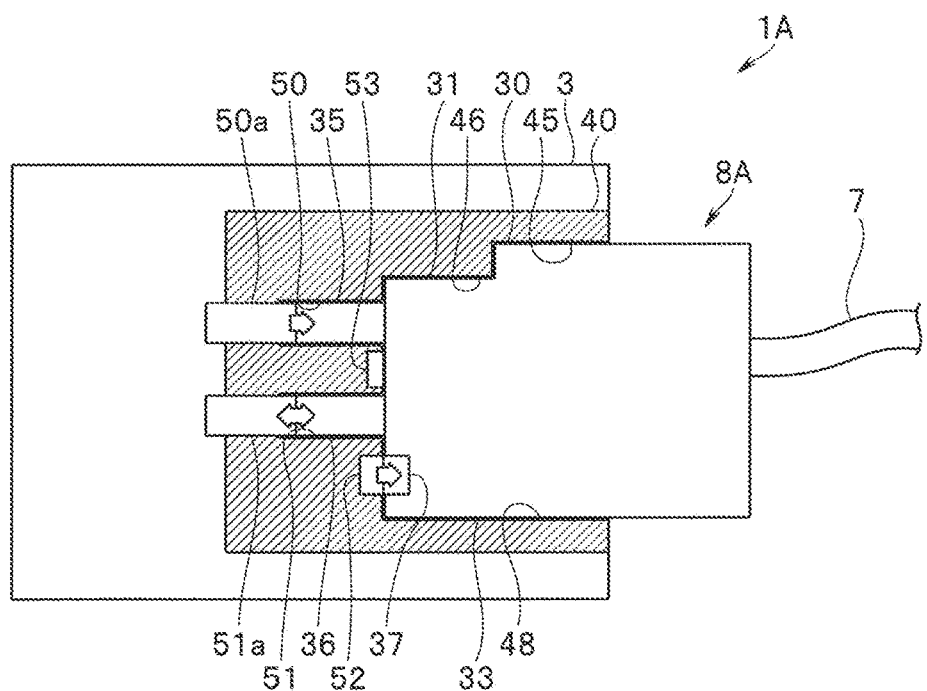
FIG. 28 is an explanatory view related to the third embodiment and showing power and signal transmission paths when the non-contact type connector for endoscope is connected to the receptacle.

In such a configuration, as shown in FIG. 28, when the first connector for endoscope 8A of the first endoscope 2A is inserted into the receptacle 40 of the endoscope processor 3, the light guide plug 35 is inserted into the light guide insertion hole 50. Thus, the end face of the light guide bundle 35a retained in the light guide plug 35 faces the end face of the light guide bundle 50a retained in the light guide insertion hole 50 so that the light guide bundle 50a and the light guide bundle 35a are optically connected. In other words, the light source can be supplied from the light guide bundle 50a to the light guide bundle 35a.

With the insertion of the first connector for endoscope SA into the receptacle 40, the optical fiber plug 36 is inserted into the optical fiber insertion hole 51. Thus, the end face of the optical fiber 36a retained in the optical fiber plug 36 faces the end face of the optical fiber 51a retained in the optical fiber insertion hole 51 so that the optical fiber 51a and the optical fiber 36a are optically connected. In other words, various signals can be transmitted and received between the optical fiber 51a and the optical fiber 36a in a non-contact manner without using the electric contact.

With the insertion of the first connector for endoscope 8A into the receptacle 40, the secondary coil 37 faces adjacently the primary coil 52 so that the primary coil 52 and the secondary coil 37 are electromagnetically connected. In other words, power can be fed from the primary coil 52 to the secondary coil 37 in a non-contact manner without using the electric contact.

Figure 29:
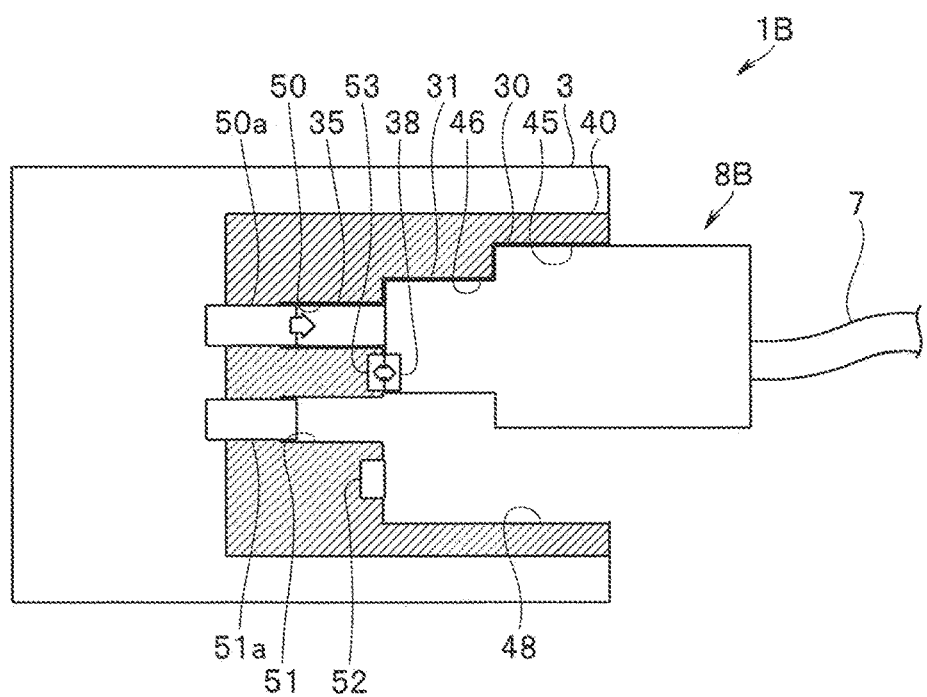
FIG. 29 is an explanatory view related to the third embodiment and showing power and signal transmission paths when the electric contact type connector for endoscope is connected to the receptacle.

Meanwhile, as shown in FIG. 29, when the second connector for endoscope 8B of the second endoscope 2B is inserted into the receptacle 40 of the endoscope processor 3, the light guide plug 35 is inserted into the light guide insertion hole 50. Thus, the end face of the light guide bundle 35a retained in the light guide plug 35 faces the end face of the light guide bundle 50a retained in the light guide insertion hole 50 so that the light guide bundle 50a and the light guide bundle 35a are optically connected. In other words, the light source can be supplied from the light guide bundle 50a to the light guide bundle 35a.

With the insertion of the second connector for endoscope 8B into the receptacle 40, the electric contacts 38 are electrically connected to the electric contacts 53 by physical contact. In other words, the electric contacts 53 can perform power feeding to and reception and transmission of various signals with the electric contacts 38.

According to such a configuration, the same advantageous effects as the advantageous effects of the aforementioned first embodiment can be produced.

Note that the present invention is not limited to the embodiments or the modifications described above, but may be modified or changed in various ways. Such modifications and changes are also within the technical scope of the present invention. For example, in the aforementioned embodiments and modifications, the description is made about the configuration in which the first connector for endoscope 8A is provided with the non-contact type power receiving member and the non-contact type signal transmitting and receiving member, the second connector for endoscope 8B is provided with the scope-side electric contact for performing power reception and signal transmission and reception, and the receptacle 40 as a connector receiver is provided with the non-contact type power feeding member, the non-contact type signal receiving and transmitting member, and the processor-side electric contact for performing power feeding and signal reception and transmission, but the present invention is not limited to such a configuration. For example, it is possible to provide the first connector for endoscope SA with either one of the non-contact type power receiving member and the non-contact type signal transmitting and receiving member, the second connector for endoscope 8B with the scope-side electric contact for performing either one of power reception and signal transmission and reception, and the receptacle 40 as a connector receiver with either one of the non-contact type power feeding member and the non-contact type signal receiving and transmitting member, and the processor-side electric contact for performing either one of power feeding and signal reception and transmission. It goes without saying that the configurations of the aforementioned embodiments and modifications may appropriately be combined.

What is claimed is:

1. An endoscope processor that allows insertion of either a first endoscope or a second endoscope, the first endoscope including a non-contact type power receiving member and a non-contact type signal transmitting and receiving member in a first connector for endoscope, the second endoscope including at least one or more scope-side electric contacts adapted to perform power reception and signal transmission and reception in a second connector for endoscope, the endoscope processor comprising:
a connector receiver that allows insertion of either the first connector for endoscope or the second connector for endoscope, the connector receiver including:
a non-contact type power feeding member configured to perform power feeding to the power receiving member without using an electric contact;
a non-contact type signal receiving and transmitting member configured to perform reception and transmission with the signal transmitting and receiving member without using an electric contact; and
at least one or more processor-side electric contacts configured to perform power feeding to and signal reception and transmission with the scope-side electric contact by contact,
wherein:
the power feeding member is provided in a position adjacently facing the power receiving member when the first connector for endoscope is inserted into the connector receiver,
an end face of the signal receiving and transmitting member is provided in a position facing an end face of the signal transmitting and receiving member when the first connector for endoscope is inserted into the connector receiver,
the processor-side electric contact is provided in a position facing the scope-side electric contact when the second connector for endoscope is inserted into the connector receiver, and
the power feeding member, the signal receiving and transmitting member, and the processor-side electric contact are arranged at different positions from one another.

2. The endoscope processor according to claim 1, wherein:
the power feeding member is electromagnetically connected to the power receiving member to perform power feeding to the power receiving member, and
the signal receiving and transmitting member is optically connected to the signal transmitting and receiving member to perform signal reception and transmission with the signal transmitting and receiving member.

3. The endoscope processor according to claim 1, wherein the signal receiving and transmitting member is disposed on a surface of the connector receiver, the surface facing an end face of the first connector for endoscope in an insertion direction.

4. The endoscope processor according to claim 1, wherein:
the connector receiver includes an inner side surface configured to face a side surface of a tubular portion projecting in an insertion direction that is included in the first connector for endoscope or the second connector for endoscope when either the first connector for endoscope or the second connector for endoscope is inserted, and
the power feeding member is disposed on the inner side surface.

5. The endoscope processor according to claim 4, wherein the processor-side electric contact is disposed on the inner side surface of the connector receiver.

6. The endoscope processor according to claim 4, wherein:
the connector receiver has a basic shape that allows insertion of either the first connector for endoscope or the second connector for endoscope that has a substantially tubular basic shape with multiple steps having a first tubular portion projecting from a distal end face in the insertion direction of a tubular connector main body, the first tubular portion having an outer periphery smaller than the connector main body and a second tubular portion projecting from a distal end face of the first tubular portion, the second tubular portion having an outer periphery smaller than the first tubular portion, the connector receiver comprising:
a first inner side surface facing a side surface of the first tubular portion; and
a second inner side surface facing a side surface of the second tubular portion,
wherein:
the power feeding member is disposed on the first inner side surface, and
the processor-side electric contact is disposed on at least one of the first inner side surface or the second inner side surface.

7. The endoscope processor according to claim 4, wherein the connector receiver has a basic shape that allows insertion of either the first connector for endoscope or the second connector for endoscope that has a substantially tubular basic shape with multiple steps having a first tubular portion projecting from a distal end face in the insertion direction of a tubular connector main body, the first tubular portion having an outer periphery smaller than the connector main body and a second tubular portion projecting from a distal end face of the first tubular portion, the second tubular portion having an outer periphery smaller than the first tubular portion, the connector receiver comprising:
an inner side surface of a reception hole main body, the inner side surface facing a side surface of the connector main body;
a first inner side surface facing a side surface of the first tubular portion; and
a second inner side surface facing a side surface of the second tubular portion,
wherein:
the power feeding member is disposed on the inner side surface of the reception hole main body, and
the processor-side electric contact is disposed on at least one of the first inner side surface or the second inner side surface.

8. The endoscope processor according to claim 1, wherein the connector receiver has a light guide insertion hole disposed on a surface facing an end face of the first connector for endoscope or the second connector for endoscope in an insertion direction when the first connector for endoscope or the second connector for endoscope is inserted, the light guide insertion hole configured to supply illumination light to the first endoscope or the second endoscope.

9. The endoscope processor according to claim 1, wherein the connector receiver has the power feeding member, the signal receiving and transmitting member, and the processor-side electric contact disposed in mutually different positions on a surface facing an end face of the first connector for endoscope or the second connector for endoscope in an insertion direction when the first connector for endoscope or the second connector for endoscope is inserted.

10. The endoscope processor according to claim 1, wherein:
the connector receiver is in a substantially square tube shape with a first inner side planar surface and a second inner side planar surface disposed parallel to each other, the first inner side planar surface and the second inner side planar surface facing an outer side surface of the first connector for endoscope or the second connector for endoscope when the first connector for endoscope or the second connector for endoscope is inserted,
the power feeding member is disposed on one of the first inner side planar surface and the second inner side planar surface, and
the signal receiving and transmitting member is disposed on another of the first inner side planar surface and the second inner side planar surface.

11. An endoscope system, comprising:
the endoscope processor according to claim 1; and
the first endoscope according to claim 1,
wherein:
the power feeding member is provided in a position adjacently facing the power receiving member when the first connector for endoscope is inserted into the connector receiver, and
the end face of the signal receiving and transmitting member is provided in the position facing the end face of the signal transmitting and receiving member when the first connector for endoscope is inserted into the connector receiver.

12. An endoscope system, comprising:
the endoscope processor according to claim 1; and
the second endoscope according to claim 1,
wherein the processor-side electric contact is provided in the position facing the scope-side electric contact when the second connector for endoscope is inserted into the connector receiver.

13. An endoscope processor that allows insertion of either a first endoscope or a second endoscope, the first endoscope including a non-contact type power receiving member in a first connector for endoscope, the second endoscope including at least one or more scope-side electric contacts adapted to perform power reception in a second connector for endoscope, the endoscope processor comprising:
a connector receiver that allows insertion of either the first connector for endoscope or the second connector for endoscope, the connector receiver including:
a non-contact type power feeding member configured to perform power feeding to the power receiving member without using an electric contact; and
at least one or more processor-side electric contacts configured to perform power feeding to the scope-side electric contact by contact,
wherein:
the power feeding member is provided in a position adjacently facing the power receiving member when the first connector for endoscope is inserted into the connector receiver,
the processor-side electric contact is provided in a position facing the scope-side electric contact when the second connector for endoscope is inserted into the connector receiver, and
the power feeding member and the processor-side electric contact are arranged at different positions from each other.

14. An endoscope system, comprising:
the endoscope processor according to claim 13; and
the first endoscope according to claim 13,
wherein the power feeding member is provided in the position adjacently facing the power receiving member when the first connector for endoscope is inserted into the connector receiver.

15. An endoscope system, comprising:
the endoscope processor according to claim 13; and
the second endoscope according to claim 13,
wherein the processor-side electric contact is provided in the position facing the scope-side electric contact when the second connector for endoscope is inserted into the connector receiver.

16. An endoscope processor that allows insertion of either a first endoscope or a second endoscope, the first endoscope including a non-contact type signal transmitting and receiving member in a first connector for endoscope, the second endoscope including at least one or more scope-side electric contacts adapted to perform signal transmission and reception in a second connector for endoscope, the endoscope processor comprising:
a connector receiver that allows insertion of either the first connector for endoscope or the second connector for endoscope, the connector receiver including:
a non-contact type signal receiving and transmitting member configured to perform reception and transmission with the signal transmitting and receiving member without using an electric contact; and
at least one or more processor-side electric contacts configured to perform signal reception and transmission with the scope-side electric contact by contact,
wherein:
an end face of the signal receiving and transmitting member is provided in a position facing an end face of the signal transmitting and receiving member when the first connector for endoscope is inserted into the connector receiver,
the processor-side electric contact is provided in a position facing the scope-side electric contact when the second connector for endoscope is inserted into the connector receiver, and
the signal receiving and transmitting member and the processor-side electric contact are arranged at different positions from each other.

17. An endoscope system, comprising:
the endoscope processor according to claim 16; and
the first endoscope according to claim 16,
wherein the end face of the signal receiving and transmitting member is provided in the position facing the end face of the signal transmitting and receiving member when the first connector for endoscope is inserted into the connector receiver.

18. An endoscope system, comprising:
the endoscope processor according to claim 16; and
the second endoscope according to claim 16, wherein the processor-side electric contact is provided in the position facing the scope-side electric contact when the second connector for endoscope is inserted into the connector receiver.

* * * * *